US010467630B2

(12) United States Patent
Iyer et al.

(10) Patent No.: US 10,467,630 B2
(45) Date of Patent: Nov. 5, 2019

(54) ORGANIZING AND CLASSIFYING SOCIAL MEDIA CONVERSATIONS TO IMPROVE CUSTOMER SERVICE

(71) Applicant: Adobe Inc., San Jose, CA (US)

(72) Inventors: Kannan Iyer, San Ramon, CA (US); Chad Michael Krsek, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 595 days.

(21) Appl. No.: 14/590,794

(22) Filed: Jan. 6, 2015

(65) Prior Publication Data

US 2016/0196561 A1 Jul. 7, 2016

(51) Int. Cl.
*G06Q 30/00* (2012.01)
*G06Q 50/00* (2012.01)
*G06Q 10/10* (2012.01)

(52) U.S. Cl.
CPC .......... *G06Q 30/016* (2013.01); *G06Q 10/10* (2013.01); *G06Q 50/01* (2013.01)

(58) Field of Classification Search
CPC ....... G06Q 50/01; G06Q 30/016; G06Q 10/10
See application file for complete search history.

(56) References Cited

U.S. PATENT DOCUMENTS 8,024,412 B2 * 9/2011 McCann ................. H04L 51/16
709/200
9,483,802 B2 * 11/2016 Gaedcke .............. G06Q 30/016
2003/0103621 A1 * 6/2003 Brown ................. H04M 3/5233
379/266.01
2009/0319617 A1 * 12/2009 Bhakar ................. G06Q 10/107
709/206
2009/0319619 A1 * 12/2009 Affronti ............... G06Q 10/107
709/206
2010/0169148 A1 * 7/2010 Oberhofer .............. G06Q 10/06
705/7.13

(Continued)

FOREIGN PATENT DOCUMENTS

WO WO-2010072889 A1 * 7/2010 ........... G06Q 10/107

OTHER PUBLICATIONS

Authors: Arup Acharya; Justin Manweiler; Shachi Sharma,; Nilanjan Banerjee, "Presense based open contact center leveraging social networks" https://ieeexplore.ieee.org/document/6573121?source=IQplus (Year: 2013).*

*Primary Examiner* — Gerardo Araque, Jr.
*Assistant Examiner* — Debra L Glennie
(74) *Attorney, Agent, or Firm* — Keller Jolley Preece

(57) ABSTRACT

The present disclosure is directed toward a message classification system that allows for improved customer service through intelligent classification of social media messages. For example, the message classification system may detect one or more messages that share a common context from within a group of messages, organize the detected messages into a messaging thread, and analyze messages within the messaging thread to identify a messaging thread classification. Further, the message classification system may analyze users participating in messaging threads to determine user classifications. Using the classified messaging thread and/or user classifications, the message classification system may assist an entity in improving social media customer service.

20 Claims, 11 Drawing Sheets

(56) References Cited

U.S. PATENT DOCUMENTS

| | | | | |
|---|---|---|---|---|
| 2011/0125793 | A1* | 5/2011 | Erhart | G06Q 30/02 707/776 |
| 2012/0022907 | A1* | 1/2012 | Fidler | G06Q 10/06 705/7.14 |
| 2013/0198180 | A1* | 8/2013 | Channing | G06F 16/901 707/736 |
| 2013/0218885 | A1* | 8/2013 | Satyanarayanan | G06Q 30/016 707/728 |
| 2013/0254089 | A1* | 9/2013 | Kirby | G06Q 40/06 705/37 |
| 2013/0282603 | A1* | 10/2013 | Gaedcke | G06Q 30/016 705/319 |
| 2014/0044246 | A1* | 2/2014 | Klemm | H04M 3/523 379/93.01 |
| 2014/0081624 | A1* | 3/2014 | Morris | G06F 9/45558 704/9 |
| 2014/0164502 | A1* | 6/2014 | Khodorenko | H04L 67/306 709/204 |
| 2014/0164530 | A1* | 6/2014 | Stoertenbecker | H04L 51/32 709/206 |

* cited by examiner

Product Q & A _512a_

Alex (Details) - Product Q & A
Reach: 3,234 Followers    Product: Model Z
Sept. 2, 2014 12:33 PM - Sept. 2, 2014 12:51 PM
6 Messages    _514a_    Status: Closed Alex: I have a few questions about the New Model Z Phone. When will it be released? How much will it cost?
Sept. 2, 2014  12:33 PM Representative: Sure. It should be released later next month. The price starts at $199.99 with a contract.
Sept. 2, 2014  12:40 PM Alex: What colors will it come in?
Sept. 2, 2014  12:45 PM Representative: Black, white, red, blue, and green.
Sept. 2, 2014  12:47 PM Alex: Awesome thanks! Can't wait to get one.
Sept. 2, 2014  12:50 PM Representative: You're welcome!
Sept. 2, 2014  12:51 PM

---

Mary (Details) - Product Q & A
Reach: 836 Followers    Product: Model Z
Dec. 2, 2014 1:03 PM - Dec. 2, 2014 1:03 PM
1 Messages    _514b_    Status: Pending Mary Davis: How many megapixels will the camera on the Model Z have?
12/02/2014 1:03 PM • Like • 👍0

---

Product Issues _512b_

Nate (Details) - Product Issues
Reach: 824 Followers    Product: Model Z
Dec. 3, 2014 9:25 PM - Dec. 4, 2014 3:38 PM
3 Messages    _514c_    Status: Closed Nate: My Model Z takes a long time to boot up. Why does it take so long?
Dec. 3, 2014  9:25 PM Representative: Have you updated to the latest software release?
Dec. 4, 2014  8:30 AM Nate: I just updated and the boot up speed is now amazing! Thanks for the tip.
Dec. 4, 2014  3:38 PM

---

Chris (Details) - Product Issues
Reach: 925 Followers    Product: Model Z
Nov. 13, 2014 12:03 PM - Nov. 14, 2014 1:03 PM
5 Messages    _514d_    Status: Pending Chris Evans: Me too - Is there a way too speed up the boot process?!
11/13/2014 4:15 PM • Like • 👍2

Representative: Mary and Chris, the new software update should speed up the bootime.
11/13/2014 5:21 PM • Like • 👍0

...

---

Product Compliment _512c_

Alex (Details) - Product Compliment
Reach: 3,234 Followers    Product: Model Z
Nov. 12, 2014 5:30 PM - Nov. 13, 2014 10:25 AM
2 Messages    _514e_    Status: Closed Alex Butler: I really like my Model Z! #ModelZ
11/12/2014  5:30 PM Representative: Glad to hear it!
11/13/2014 10:15 AM • Like • 👍1

---

Sara (Details) - Product Compliment
Reach: 336 Followers    Product: Model Z
Nov. 12, 2014 4:30 PM - Nov. 13, 2014 11:20 AM
2 Messages    _514f_    Status: Closed Sara: The Model Z case is so pleasing to the eye! #eyecandy
Dec. 3, 2014  9:25 PM Representative: We think it looks it great too!
Dec. 4, 2014  8:30 AM

Influencers 612a

Alex (Details)
Reach: 3,234 followers
Connections Determined:
Engagement Rate: 34 activities/day
Positive: 1209 activities
Status: Verified

Mary (Details)
Reach: 836 followers
Connections Determined:
Engagement Rate: 12 activities/day
Positive: 596 activities
Status: Verified

Chris (Details)
Reach: 925 followers
Connections Determined:
Engagement Rate: 15 activities/day
Positive: 620 activities
Status: Verified

James (Details)
Reach: 14,871 followers
Connections Determined:
Engagement Rate: 227 activities/day
Positive: 1826 activities
Status: Verified

Ben (Details)
Reach: 9,683 followers
Connections Determined:
Engagement Rate: 108 activities/day
Positive: 988 activities
Status: Verified

Spammers 612b

Greg (Details)
Reach: 842 followers
Connections Determined:
Engagement Rate: 12 activities/day
Negative: 630 activities
Status: Verified

Kelly (Details)
Reach: 7,343 followers
Connections Determined:
Engagement Rate: 128 activities/day
Negative: 2508 activities
Status: Verified

Seth (Details)
Reach: 72 followers
Connections Determined:
Engagement Rate: 108 activities/day
Negative: 12,382 activities
Status: Verified

At Risk Customers 612c

Ryan (Details)
Reach: 200 followers
Connections Determined:
Engagement Rate: 18 activities/day
Recent Activity: Neutral
Status: Verified

Tonya (Details)
Reach: 835 followers
Connections Determined:
Engagement Rate: 39 activities/day
Recent Activity: Negative
Status: Verified

Jana (Details)
Reach: N/A
Connections Determined:
Engagement Rate: 72 activities/day
Recent Activity: Neutral
Status: Verified

Eve (Details)
Reach: 1,334 followers
Connections Determined:
Engagement Rate: 147 activities/day
Recent Activity: Positive
Status: Verified

*Fig. 6*

ORGANIZING AND CLASSIFYING SOCIAL MEDIA CONVERSATIONS TO IMPROVE CUSTOMER SERVICE

CROSS REFERENCE TO RELATED APPLICATIONS

N/A

BACKGROUND

1. Technical Field

One or more embodiments relate generally to organizing and classifying social media posts. More specifically, one or more embodiments relate to intelligent classification of social media messages to improve customer service.

2. Background and Relevant Art

Social media is an increasingly popular means of facilitating discussions regarding a variety of topics, especially in the area of customer service feedback. For example, a social media user may post a question regarding products or services. As another example, a social media user may use social media messages to voice a complaint or provide other feedback regarding a business' product or service. The social media user may post social media messages directly to a business, such as a business's social media site, or indirectly by mentioning (e.g., tagging) the business in a social media message post.

In some instances, a discussion may ensue based on the user's social media message. For example, a user's social media message may initiate a social media discussion that is centered on a question or issue the user is having, or the user's opinion regarding a product or service. Social media posts may grow into lengthy discussions that can span for days, weeks, or even months. As the length of social media discussions increase, a business may struggle to address each issue posted in the social media discussion, especially if the topic of the social media discussion frequently changes.

In many case, the business (or a representative or agent responding for a business) may only respond to the most recent question posted in the social media message. As the social media discussion grows, however, the original focus of the social media discussion may shift to different topics. For example, if the user's original issue is resolved, the user may continue asking questions in the same discussion thread. Further, other users may also interject questions, comments, and opinions into the social media discussion. When this happens, the business may fail to recognize some questions in the social media discussion. In addition, the representative may miss potentially helpful answers, compliments, or other feedback that other social media users post in the social media discussion.

As another problem, social media discussions that include multiple topics and exchanges between a representative and multiple users are often difficult for businesses to accurately classify. In other words, a business may initially categorize a social media discussion at the start of the social media discussion, however, as the social media discussion grows, the initial classification may no longer appropriately characterize the social media discussion.

Further, when the business reviews and analyzes past discussions to determine points of success and failure, the business may miss out on the opportunity to use an unrecognized discussion to improve future social media discussions on an individual social media discussion level. To illustrate, a social media discussion may address and resolve multiple customer issues. The business, however, may only recognize the last topic discussed in the social media discussion when analyzing the discussion for successes and failures. Alternatively, the business may only recognize the first questions in the social media discussion. The social media discussion, however, may include a number of additional resolved issues. In other words, the business can overlook one or more other issues in the social media discussion buried within the social media discussion. As a result, the business can lose the opportunity to accurately measure, analyze, study, and learn from each success or failure that occurs in a social media discussion.

Further, the business may lose opportunities to properly measure the effort of social media management among multiple social media discussions. For example, the business may lose the opportunity to measure the number of resolved cases or the number of answered questions in a particular category of conversation, such as complaints, questions and answers, or in a general forum. Also, the business may fail to measure and/or recognize which users are loyal customers, at-risk customers, or spammers. Without this and other similar information, the business may not be able to optimally allocate their time and priorities to appropriate content and/or users.

Thus, there are several disadvantages to current methods for intelligent classification of social media messages.

SUMMARY

One or more embodiments described herein provide benefits and/or solve one or more of the foregoing or other problems in the art with systems and methods that allow for improved customer service through intelligent classification of social media messages (or simply "messages"). For example, the systems and methods of one or more embodiments identify a group of messages between multiple social media users. The systems and methods detect one or more messages from the group of messages that share a common context, such as linked messages, messages associated with a particular user, messages sharing common keywords, and/or messages posted within a time threshold. In addition, the systems and methods organize the detected messages that share the common context into a messaging thread. Further, the systems and methods analyze the messaging thread to identify a context. Upon identifying the context, the systems and methods identify a customer service classification for the messaging thread based on the messaging thread context.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore considered to be limiting of its scope, the invention will be described and explained with additional specificity and detail through the use of the accompanying drawings in which:

FIG. 5 illustrates a plurality of messaging threads organized based on contexts of the messaging threads in accordance with one or more embodiments;

FIG. 6 illustrates a plurality of social media users classified in accordance with one or more embodiments;

DETAILED DESCRIPTION

Figure 1:
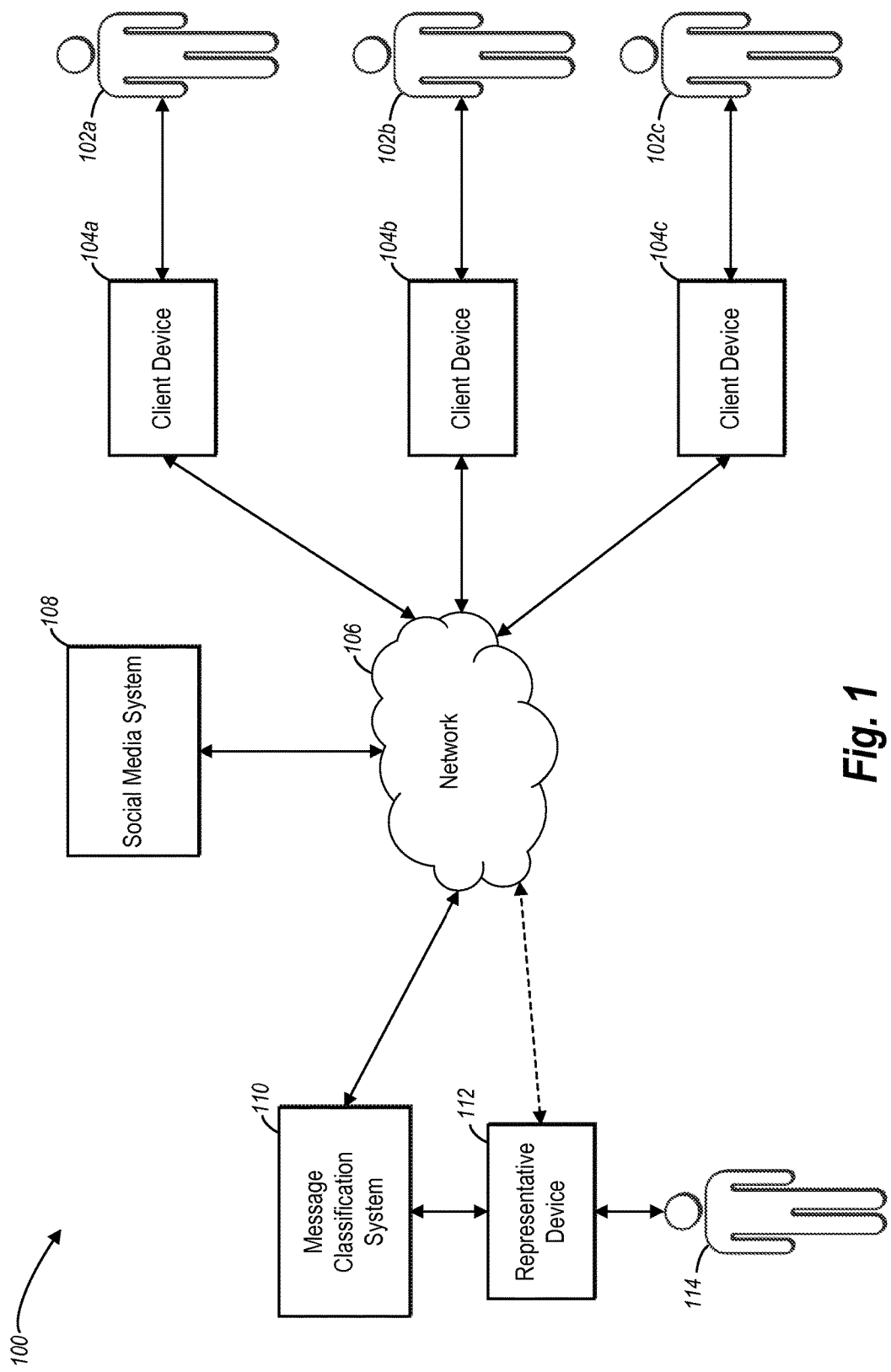
FIG. 1 illustrates a block diagram of an exemplary environment in which a message classification system interacts with social media users and a social media system in accordance with one or more embodiments.

One or more embodiments described herein include a message classification system that allows businesses to improve customer service through intelligent classification of social media messages. To illustrate, the message classification system of may identify a social media messaging discussion that includes messages between a social media user (e.g., a customer or potential customer) and a representative (e.g., a customer service representative or agent). The message classification system may detect messages between the social media user and the representative that share a common context. The message classification system can then organize messages that share a common context into a messaging thread. Additionally, the message classification system may analyze messages within the messaging thread to identify content, such as a keyword, a question, positive or negative user sentiment, and/or a classification tag selected by a representative. The message classification system may then classify the messaging thread into categories based on the identified content. The message classification categories can relate to customer service classification categories, such as general questions and answers, complaints, feedback/opinions, etc.

To illustrate, the message classification system can identify a group of social media messages between multiple social media users and a representative associated with an entity (e.g., a business, corporation, company). The message classification system may detect messages in the group of messages between a particular user and the representative that relate to a common topic, issue, or question. Using the detected messages, the message classification system may organize a messaging thread that includes related messages and excludes unrelated messages. The message classification system may then analyze content within the messaging thread to determine a classification type for the messaging thread.

The message classification system may provide a number of advantages in improving customer service through intelligent social media message classification. As one example, the message classification system may identify multiple messaging threads in a social media discussion and may separately provide each messaging thread to a representative. This can allow the representative to address individual issues, problems, or topics. In particular, the message classification system may provide, to a representative, a messaging thread that filters out other irrelevant or unnecessary social media messages in a social media discussion. To illustrate, while a social media user is conversing with a representative about a user account issue, the social media user may also ask questions regarding a new product. In this instance, the message classification system detects and organizes the messages relating to the user account in one messaging thread, and organizes the social media messages relating to questions about the new product in a second messaging thread. After organizing the two messaging threads, the message classification system can classify each messaging thread and present the classified messaging threads to the representative.

The message classification system can use a number of contextual factors to detect messages within a social media discussion and organize the detected messages into a messaging thread. As one example, the message classification system can detect all messages in a social media discussion between a particular user and a representative. The message classification system may then organize the detected messages into a messaging thread. As a further example, the message classification system may detect and organize a messaging thread based on message timestamps. For example, the message classification system may detect messages posted within a day of each other and organize those messages into a messaging thread. As another example, the message classification system may detect content, such as related keywords, in multiple messages in a social media discussion and organize those messages into a messaging thread. In yet another example, the message classification system may detect message cues, such as greetings and closings, in a social media discussion to determine when one messaging thread ends and another messaging thread begins. Additional examples and explanations regarding the message classification system detecting messaging threads are provided below.

In one or more embodiments, the message classification system may classify messaging threads into customer service classification types or categories. In particular, after the message classification system organizes each messaging thread, the message classification system may determine a classification for each messaging thread. The message classification system may then determine a customer service classification type for each messaging thread based on the content within each messaging thread. Examples of content may include keywords, sentiment, or the presence of a question. In one or more embodiments, the message classification system may group similarly classified messaging threads together. Classification groups include, but are not limited to, questions and answers, complaints, compliments, opinions and/or general feedback.

By grouping similarly classified messaging threads together, the message classification system may assist a representative in addressing and resolving similar messaging threads from multiple social media users. For example, the message classification system may identify a solution to a social media user's problem in another messaging thread in the same messaging thread group. The message classification system can they provide the identified solution to the social media user, either directly or via the representative.

As another example, the message classification system may provide a classified messaging thread to a representative that is knowledgeable or has expertise in the classification area. To illustrate, the message classification system may classify a messaging thread based on the content of the messaging thread. After classifying the messaging thread, the message classification system may determine that the messaging thread classification matches the expertise and/or experience of one or more representatives. Then, the message classification system can assign an experienced representative to messaging thread and the representative can address to the social media user's question.

In one or more embodiments, the message classification system can further classify one or more users of a social media discussion and/or discussion threads. The message classification system may classify users in a social media discussion based on social media characteristics, such as social media reach, contribution type, and/or customer type. For example, the message classification system may determine the social media reach of a social media user based on the number of social media networks in which the user participates in and the user's total number of followers and/or connections. The message classification system may classify the social media user based on whether a user's ability to reach other social media users is great, average, or minimal. For example, if a social media user has thousands of connections, the message classification system may classify the social media user as influential. Alternatively, or in additional embodiments, the message classification system may classify a user as a positive or negative social media contributor, such as an advanced user that provides useful solutions or a spammer who repetitively posts negative comments about the entity. Further, the message classification system may classify a social media user based on customer type, such as if the social media user is a long-time customer, first-time customer, potential customer, at-risk customer, etc.

In addition to classifying discussion threads and/or classifying users, in one or more embodiments, the message classification system may analyze one or more classification groups to improve customer service. For instance, the message classification system may process and analyze current and previous discussion threads using an algorithm. The algorithm may be a machine-learning algorithm that improves with each discussion thread that the algorithm processes. Further, representatives may also provide manual input, such as classifying or reclassifying messaging threads. When a representative manually classifies or reclassifies a messaging thread, the algorithm may learn from the representative's input. The message classification system may then use the machine-learning algorithm to more accurately classify future discussion threads, detect commonalities between present and future discussion threads, and to identify positive or negative messaging thread outcomes. As such, the message classification system may analyze messaging threads to improve customer service in future social media discussions.

The message classification system may use analytics from the classified messaging threads to improve customer service. In particular, the message classification system may analyze classified messaging threads and provide customer service metrics that indicate areas where customer service quality is high, and areas where customer service improvement is possible. In addition, the message classification system can determine other helpful measurements that can improve customer service. For example, the message classification system may determine the most frequent questions asked by social networking users, if those questions currently have solutions, or if additional resources need to shift to address the questions. Further, the message classification system may identify which messaging threads have resulted in positive outcomes and which messaging threads have resulted in failed or negative outcomes. As another example, the message classification system may identify the average message length of a successful messaging thread verses the average message length of an unsuccessful messaging thread. In addition, the message classification system can detect trends including a weekly total of successfully resolved, pending, and/or failed messaging threads.

Accordingly, the message classification system, through intelligently organizing and categorizing social media messages, can present opportunities for an entity to improve customer service among customers and potential customers. In other words, an entity can use the message classification system to better provide satisfactory customer service to a customer as well as change a customer's sentiment about the entity's product from negative to positive. Further, when an entity successfully resolves a customer's concern, the message classification system can assist the entity in identifying beneficial solutions and re-posting the social media messages for the benefit of other customers, such as on a F.A.Q. (frequently asked questions) section of the entity's website. In addition, the message classification system can provide the entity with customer service quality metrics to help the entity identify how to improve in the area of social media customer service.

As used herein, the term "social media system" refers to a system that supports or enables on-line communication, input, interaction, content sharing, and collaboration between social media users. Example social media systems include TWITTER™, FACEBOOK™, PINTEREST™, GOOGLE+™, LINKEDIN™, TUMBLR™, REDDIT™, YOUTUBE™, etc. The term "social media message" refers to content added or inputted to a social media system. Example social media messages include user comments, photos, videos, advertisements, sponsored posts, etc. Furthermore, social media messages can include acceptance or agreement of other social media posts such as "likes," "retweets," "pins," etc.

As used herein, the terms "social media discussion" or "social community" refers generally to a string of social media messages. One or more social media users may participate in a social media discussion. Further, a social media discussion may include one or more messaging threads. As used herein, the term "messaging thread" refers to social media messages in a social media discussion that relate to a single topic, issue, problem, concern, or area. In the context of this disclosure, a messaging thread often includes a social media user and a representative exchanging social media messages exchanging social media messages relating to an issue. In some embodiments, however, a messaging thread may include multiple social media users with or without a representative participating in the social media discussion. Further, a messaging thread may include a single social media message posted by a user or multiple social media messages.

As used herein, the term "representative" refers to an agent of an entity, business, corporation, or company. A representative may be a person, such as a customer service agent, a sales agent, or a technical support agent. Alternatively, the representative may be an automated service, such as a computer and/or software program. The term representative may refer to a single agent or multiple agents. For example, when a representative is corresponding with a social media user, multiple customer service agents may be corresponding with the social media user.

As used herein, the term "sentiment" refers to a view, attitude, or opinion regarding a topic. Sentiments can be positive, negative, or neutral. For example, a social media message can have a positive sentiment if the social media message casts a product or service in a positive light. Along related lines, a social media message can have a negative sentiment if the social media message casts a product or service in a negative light. Furthermore, sentiments can have varying levels of positivity or neutrality.

As used herein, the term "digital medium environment" refers to an environment that is implemented, for example, as a stand-alone application (e.g., a personal computer or mobile application running on a computing device), as a module of an application, as a plug-in for applications including social media applications, as a library function or functions that may be called by other applications such as social media applications, and/or as a cloud-computing system. A digital medium environment allows users to exchanging social media communications, such as social media messages between social media users and a representative in one or more social communities.

FIG. 1 is a schematic diagram illustrating a system 100 in accordance with one or more embodiments. As illustrated in FIG. 1, the system 100 can include users 102a, 102b, and 102c, client devices 104a, 104b, and 104c, and a network 106. In one or more embodiments, the users 102a, 102b, and 102c can interact with the client devices 104a, 104b, and 104c, respectively. Examples of client devices include, but are not limited to, mobile devices (e.g., smartphones, tablets, PDA), laptops, desktops, or any other type of computing device, such as those described in relation to FIG. 9. While FIG. 1 illustrates three users 102a, 102b, 102c and three client devices 104a, 104b, and 104c, the system 100 can include any number of users and/or client devices.

The client devices 104a, 104b, 104c can communicate with a social media system 108 and a message classification system 110 through the network 106. Although FIG. 1 illustrates a particular arrangement of the users 102a, 102b, 102c, the computing devices 104a, 104b, 104c, the network 106, the social media system 108, and the message classification system 110, various additional arrangements are possible. For example, the computing devices 104a, 104b, 104c may directly communicate with the social media system 108, bypassing the network 106.

As mentioned, the client devices 104a, 104b, 104c can communicate with the social media system 108 through the network 106. In one or more embodiments, the network 106 may include the Internet or World Wide Web. The network 106, however, can include various other types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Example networks and network features are described below with reference to FIG. 9.

The client devices 104a, 104b, 104c of FIG. 1 can also send and receive social media messages by way of the social media system 108. For example, a social media application can run on each client device 104a, 104b, 104c, and thus be able to communicate with the social media system 108. The social media application can receive inputs from a user via a client device 104a (e.g., such as through a touch screen) to allow the user to input text, or other types of media, for use in social media messages. Thus, a user can send social media messages to social media applications of other users via the social media system 108.

The social media system 108 can post the social media messages (whether text or otherwise) to a social media graphical user interface (or "wall" or "feed") of one or more users of the social media system 108. For example, the social media system 108 may present the users 102a, 102b, 102c with a social media feed including social media messages from one or more co-users associated with the users 102a, 102b, 102c via the social media system 108. In one or more embodiments, each user may scroll through their social media feed in order to view recent social media messages submitted by the one or more co-users associated with the users 102a, 102b, 102c via the social media system 108. In one embodiment, the system 100 may organize the social media messages chronologically on a user's social media feed. In alternative embodiments, the social media system 108 may organize the social media messages geographically, by interest groups, according to a relationship coefficient between the user and the co-user, etc. Additionally, in one or more embodiments, the users 102a, 102b, 102c may download a copy of their social media feed as a record of their social media messages.

As further illustrated in FIG. 1, the system 100 may include a message classification system 110, a representative device 112, and a representative 114. The message classification system 110 may be associated with an entity, such as a business, corporation, or company. The representative 114 may use the representative device 112 to communicate with users on the social media system 108 via the network 106, such as to answer questions and resolve concerns associated with the entity (e.g., questions about the entity's products or services). The representative device 112 may also be connected to the message classification system 110, and in some instances, directly to the network 106. While one representative 114 and representative device 112 are illustrated, the system 100 can include any number of representatives and representative devices connected to the message classification system 110 and/or network 106.

In some embodiments, the message classification system 110 may identify social media messages associated with the entity that are posted by users via the social media system 108. In particular, the message classification system 110 may identify social media messages posted by users that are associated with products and services provided by the entity. For example, the message classification system 110 may detect social media messages on the social media system 108 that mention one of the entity's products or a social media message or asks the entity a question regarding a service/product provided by the entity.

In one or more embodiments, the message classification system 110 may organize messaging threads based on the identified social media messages. For example, if the message classification system 110 identifies social media messages in which a first user 102*a* asks a question to the entity about a product feature, the message classification system can organize social media messages relating to the question into a messaging thread. The message classification system can also detect and organize other messaging threads based on social media messages regarding other questions, concerns, or comments associated with the entity.

Further, as described below, the message classification system 110 can classify messaging threads based on the content within each messaging thread. For example, the message classification system may classify a messaging thread under one of the following categories: questions and answers, complaints, opinion/feedback, positive reviews, FAQs, technical problems, account questions, public relations, product issues, help desk, etc.

In some embodiments, the message classification system 110 can provide the classified messaging thread to the representative 114. The representative 114 can quickly ascertain the background of the messaging thread based on the messaging thread classification. In addition, the representative 114 can easily review messages within the messaging thread to gain a full understanding of the user's issue or problem. Further, the representative 114 can review messages in the messaging thread without being bogged down with unrelated or irrelevant messages, which the message classification system 110 has removed from the messaging thread. In this manner, the representative 114 can quickly review a user's issue or problem and provide a relevant and proper resolution to the user.

In one or more embodiments, the message classification system 110 may classify users associated with messaging threads. For example, the message classification system may classify users in a social media discussion based on social media characteristics, such as a user's social media reach, contribution type, social media influence (either positive or negative), and/or customer type. For instance, the message classification system 110 may classify the first user 102*a* as an influencer, the second user 102*b* as a spammer, and the third user 102*c* as an at-risk user.

The representative 114 can use the user's classification to better respond to the user. For example, the message classification system 100 may assign a response priority for the user based on the user's classification type. If the message classification system 110 classifies a user as an influencer, the message classification system 110 may assign the user a higher response priority than a user classified as a spammer. Representatives may prioritize user responses based on the response priority assigned to users who have issues, comments, or questions.

In some embodiments, the message classification system 110 may use classified messaging threads to perform customer service analytics. For example, the message classification system 110 may analyze recent messaging threads categorized as complaints to determine the top five recent complaints expressed by users. As another example, the message classification system 110 may analyze resolved messaging threads to determine common solutions to problems and to post the common solutions on a FAQ web page. Additional examples of categorized messaging thread analytics will be disclosed below.

Figure 2:
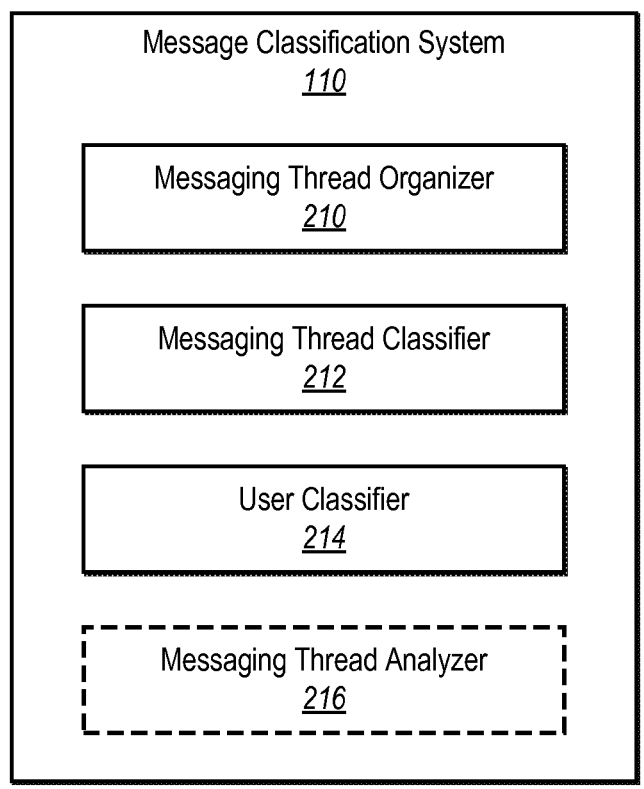
FIG. 2 illustrates a schematic diagram of the message classification system of FIG. 1 in accordance with one or more embodiments.

FIG. 2 illustrates a schematic diagram illustrating an embodiment of the message classification system 110. As shown, the message classification system 110 may include, but is not limited to, a messaging thread organizer 210, a messaging thread classifier 212, and a user classifier 214. Optionally, in some embodiments, the message classification system 110 may include a messaging thread analyzer 216. Each of the components 210-216 of the message classification system 110 may be in communication with one another using any suitable communication technologies. Although the disclosure herein shows the components 210-216 to be separate in FIG. 2, any of the components 210-216 may be combined into fewer components, such as into a single facility or module, or divided into more components as may serve one or more embodiments. In addition, the components 210-216 may be located on, or implemented by, one or more computing devices, such as those described below in relation to FIG. 9.

The components 210-216 can comprise software, hardware, or both. For example, the components 210-216 can comprise one or more instructions stored on a computer readable storage medium and executable by a processor of one or more computing devices. When executed by the one or more processors, the computer-executable instructions of the message classification system 110 can cause a computing device(s) to perform the methods described herein. Alternatively, the components 210-216 can comprise hardware, such as a special-purpose processing device to perform a certain function. Additionally or alternatively, the components 210-216 can comprise a combination of computer-executable instructions and hardware.

As mentioned above, and as shown in FIG. 2, the message classification system 110 can include a messaging thread organizer 210. In general, the messaging thread organizer 210 detects contextually related messages and organizes the detected messages into a messaging thread. More specifically, the messaging thread organizer 210 identifies a group of social media messages that are associated with an entity. The messaging thread organizer 210 analyzes the identified social media messages to detect messages that share a common context. The messaging thread organizer 210 further organizes the detected messages into a messaging thread.

As mentioned, the messaging thread organizer 210 may identify a group of social media messages that are associated with an entity. For example, the messaging thread organizer 210 may identify social media messages that are directed towards the entity, such as messages posted on a social media page controlled by the entity. For instance, the messaging thread organizer 210 may identify social media messages posted by users to a FACEBOOK™ or GOOGLE+™ social media page maintained by the entity. Additionally or alternatively, the messaging thread organizer 210 may identify social media messages directly addressed to the entity. To illustrate, the messaging thread organizer 210 may identify a TWITTER™ message that includes (e.g., mentions, tags, identifies) the entity in the message. In some embodiments, a user may post social media messages to a web site associated with the entity, such as a customer service forum. One will appreciate that the messaging thread organizer 210 can identify social media messages associated with an entity in a variety of ways and using a variety of social media platforms or social communities.

Further, the messaging thread organizer 210 may gather messages from different social media systems and social communities and combine the messages into a group of messages. For example, the messaging thread organizer 210 may identify messages relating to the entity on both TWITTER™ and REDDIT™. As another example, the messaging thread organizer 210 may identify that a user initiated a conversation with a representative via one social media system and finished the conversation using another social media system. Additionally or alternatively, the messaging thread organizer 210 may identify that the user and the representative are using a non-public forum to communicate, such as direct message, chat, instant message, email, telephone, etc.

Once the messaging thread organizer 210 identifies a group of social media messages associated with an entity, the messaging thread organizer 210 may detect messages within the group of messages that share a common context. In some embodiments, the messaging thread organizer 210 may use a machine-learning algorithm to identify common contexts between messages in a group of messages. The machine-learning algorithm may use one or more factors in determining if any messages share a common context. Examples of factors include, but are not limited to, messages associated with a particular user, messages linked to previous messages, messages having similar keywords, messages posted within a specific timeframe, messages having a common tag, messages including greetings/closing, etc.

To illustrate, the messaging thread organizer 210 may determine whether two or more messages share a common context based on whether the messages belongs to the same conversation or discussion. In some social media system or social communities, messages may include an API tag, such as reply tag that indicates the message id of the previous message in the discussion (e.g., in_reply_to_id). For example, a user and a representative may discuss an upcoming software update over TWITTER™, both the user and the representative add to the discussion by replying to previous messages in the discussion. As such, the messaging thread organizer 210 detects each message in the discussion as having a common context.

In one or more embodiments, however, a group of messages, such as social media messages in a discussion thread, can include multiple contexts. For instance, the topic of the social media discussion may change between various topics as the social media discussion evolves. Further, when additional users contribute to the social media discussion, the additional users may introduce new contexts into the social media discussion. As such, the messaging thread organizer 210 may detect multiple contexts within a social media discussion.

To illustrate, in one or more embodiments, the messaging thread organizer 210 may detect common contexts based on the author of one or more messages in a social media discussion. For example, the messaging thread organizer 210 may isolate messages in a social media discussion that are authored by a particular user. In addition, the messaging thread organizer 210 may identify messages that are in reply to the particular users' messages, such as replies by a representative. For instance, the messaging thread organizer 210 may detect messages between the particular user and the representative as having a common context, which, as a result, excludes other messages in the social media discussion. The messaging thread organizer 210, however, may identify that other messages in the same social media discussion share other common contexts.

In additional or alternative embodiments, the messaging thread organizer 210 may detect messages that share a common context in a group of messages based on keywords. For example, the messaging thread organizer 210 may identify matching or associated keywords within messages in the group of messages. For instance, the messaging thread organizer 210 may detect the keywords "under warranty," "recently purchased," and "product exchange" in a subset of messages within a group of messages. Accordingly, the messaging thread organizer 210 may identify that this subset of messages share a common context. Alternatively, in other instance, the messaging thread organizer 210 may identify keywords associated with different products in messages. The messaging thread organizer 210 may determine, depending on the compatibility of the products, that the messages have different contexts.

As another example, the messaging thread organizer 210 may determine whether a time elapsed between the first and last message, or subsequent messages in a group of messages exceeds a specified period. The specified period may be one or more hours, one or more days, one or more weeks, one or more months, etc. If the messaging thread organizer 210 determines that the time gap between two messages exceeds the specified period, the messaging thread organizer 210 can determine that the two messages have different contexts. Alternatively, as described above, the messaging thread organizer 210 may use the time gap as one factor in determining whether two messages share a common context.

In additional embodiments, the messaging thread organizer 210 may identify common contexts in messages based on message cues, such as greetings and/or closings in the messages. For example, the messaging thread organizer 210 may detect greetings such as "hello," "hey," or "I have a question," or closings, such as "thank you," "you're welcome," "that is it," good bye," etc., in a message to determine where one message context ends and where another message context begins.

In addition, the messaging thread organizer 210 can identify whether a representative tags one or more messages as having a specific context. To illustrate, when a representative responds to a concern or problem, the representative can tag the social media message with a particular context tag and/or classification tag. As such, the messaging thread organizer 210 can identify common contexts based on the representative's classification tag. Further, the messaging thread organizer 210 can learn from the representative's classification tag and improve context identification with future messages that are similar in nature.

In one or more embodiments, the messaging thread organizer 210 can organize the identified messages sharing a common context into a messaging thread. In other words, each time the messaging thread organizer 210 detects one or more messages in a group of messages having a common context, the messaging thread organizer 210 can organize the detected messages into a messaging thread. In this manner, the messaging thread organizer 210 can organize a messaging thread from a group of messages to include messages that share a common context while excluding other unrelated and/or irrelevant messages from the same group of messages.

As shown in FIG. 2, the message classification system 110 can include a messaging thread classifier 212. In general, the messaging thread classifier 212 can classify messaging threads into categories or buckets. More specifically, the messaging thread classifier 212 can classify a messaging thread based on content in the messaging thread, such as one or more keywords, the presence of one or more questions, positive or negative sentiment expressed by a user, a classification tag selected by a representative, etc. Examples classifications include, but are not limited to, questions and answers (Q&A), complaints, opinions/feedback, positive reviews, frequently asked questions (FAQ), technical problem, help desk questions, account questions, public relations, product issues, etc.

In one or more embodiments, the messaging thread classifier 212 may use a machine-learning algorithm to classify a messaging thread. The machine-learning algorithm may be the same machine-learning algorithm discussed above in connection with the messaging thread organizer 210, or may be a separate machine-learning algorithm. The machine-learning algorithm may use a number of factors to identify a classification for a messaging thread.

As mentioned, in one or more embodiments, the messaging thread classifier 212 may classify a messaging thread based on the detection of one or more keywords. For example, if the messaging thread classifier 212 identifies the name of a product or service in a messaging thread, the messaging thread classifier 212 may classify the messaging thread under a category associated with the product or service. For instance, if the messaging thread classifier 212 identified the keywords "Model Z" and "features" near each other in a messaging thread, the messaging thread classifier 212 may classify the messaging thread as "Product Inquiry—Model Z." As another example, the messaging thread classifier 212 may classify a messaging thread under the category "Account Issues" when the messaging thread classifier 212 detects keywords such as "account," "bill," "service," etc.

In one or more embodiments, the messaging thread classifier 212 may classify a messaging thread based, in part, on user sentiment. For example, words such as "great," "good," "awesome," "easy," "best," "perfect," "love," "learn," "helpful," "useful," "thanks," "ever," and "simple" may indicate positive sentiment. As such, the messaging thread classifier 212 may classify these messaging threads as "Testimonials," "Opinions/Feedback," and/or "Positive Reviews." Conversely, words such as "tried," "can't," "fail," "junk," "terrible," "slow," "sucks," "upgrade," "annoying" "meh," "not," "lag," crashes," "always," "worst," "needs," "stop," "zero," "horrible," "crap," "no," "fix," "broken," "bad," "buggy," and "freeze" may indicate negative sentiment. The messaging thread classifier 212 may classify messaging threads containing negative sentiment as "Complaints," "Opinions/Feedback," etc.

In additional embodiments, the messaging thread classifier 212 may classify a messaging thread based, in part, on identifying one or more questions within a messaging thread. For example, if the messaging thread classifier 212 detects one or more sentences ending in a question mark ("?"), the messaging thread classifier 212 may classify the messaging thread under the category of "Q&A." Additionally, the messaging thread classifier 212 may classify the messaging thread under the category of "Q&A" upon detecting the words "what," "why," "how," "if," etc., at the beginning of a sentence in a messaging thread.

In one or more embodiments, a representative may tag a messaging thread as belonging to one or more categories. For example, when a representative is addressing a user's problem or issue, the representative may manually classify the messaging thread by tagging the messaging thread. Additionally, the messaging thread classifier 212 may provide a list of suggested classifications to the representative, and the representative may select one of the suggested classifications. Further, a representative can manually edit, change, remove, or add a classification to a previously classified messaging thread.

When a representative tags a messaging thread under a specific classification, the messaging thread classifier 212 may associate the content within the messaging thread with the selected classification. In this manner, the messaging thread classifier 212 can improve future classifications for messaging threads where the content is similar to content in a messaging thread where a representative has manually selected a classification. If the messaging thread classifier 212 is using the machine-learning algorithm, the machine-learning algorithm learn from the manual classification and apply the classification to messaging threads in the future that have the same content.

In some embodiments, the messaging thread classifier 212 can identify and associate metadata with a messaging thread. For example, the messaging thread classifier 212 may create a messaging thread summary that provides information regarding a messaging thread. The messaging thread summary may include details, such as the primary user associated with the messaging thread (e.g., user name/id), the classification type of the messaging thread, the user's social media reach (e.g., number of followers), social media system(s) used by the user, the date range of the messaging thread (e.g., start and end time), the number of messages in the messaging thread, the current status of the messaging thread (e.g., active, pending, closed, resolved), products purchased or licensed by the user, and/or notes about the messaging thread (e.g., if a resolution occur offline, such as over the phone). Additional detail regarding the messaging thread summary will be discussed below.

FIG. 2 also shows the user classifier 214 in the message classification system 110. In general, the user classifier 214 can classify users based on a number of user characteristics. For example, the user classifier 214 can classify a user based on a user's social media reach, social media message contribution type, and/or customer type. Examples of user classification types or categories include influencers, spammers or trolls, at-risk customers, loyal customer, first-time product owner, potential customer, product expert, new user, or unknown.

In one or more embodiments, the user classifier 214 may identify and/or determine one or more user characteristics before assigning a user classification to a user. For example, the user classifier 214 may determine the social media reach of the user. In particular, the user classifier 214 may determine the social communities to which the user belongs, the number of followers the user has in each social community, the user's total number of friends, followers, or connections, whether the number of followers is increasing or decreasing, how active a user is within each social communities (e.g., engagement rates, such as activities/day), etc. As such, if the user has a large following, the user classifier 214 may classify the user as an influencer or a higher priority customer because the user has the ability to build or weaken the reputation of the entity based on the user's experience. In some cases, the user classifier 214 may assign a user that is influencer a higher response priority.

Further, the user classifier 214 may determine the contribution type of a user, such as if the how often a user posts social media messages (e.g., posts/day), whether social media posts are positive or negative, the average length of each posted social media message, and the average number of reply messages to social media message that the user posts. Additional examples of a user's social media message contribution type can include the average number of "likes," shares, re-posts, etc., the user gives and receives. Based on the user's contribution type, the user classifier 214 can classify the user as a positive contributor (e.g., an influencer), or a negative contributor (e.g., a troll or a spammer). For example, if the user posts a high percentage of negative comments about the entity, the user classifier 214 may classify the user as a spammer. Further, the user classifier 214 may assign the user a lower response priority, allowing representatives to respond to higher priority users. Alternatively, the user classifier 214 may assign a user who is a spammer, but has a large following, a higher response priority to try and convert the user from a spammer to a positive influencer.

In addition, the user classifier 214 can identify products purchased by or licensed to the user. For example, if the user previously purchased products from the entity, but is showing doubt about current or future products (e.g., an increase in negative comments), the user classifier 214 may classify the user as an at-risk user. The user classifier 214 may increase the response priority of an at-risk user. For example, the user classifier can increase the priority of an at-risk user above that a spammer or even an influencer. As another example, if the user is considering making their first purchase, the user classifier 214 may classify the user as a potential customer, or as a first-time product user after the user completes their first purchase.

As shown in FIG. 2, the message classification system 110 may optionally include a messaging thread analyzer 216. In general, the messaging thread analyzer 216 performs analytics on the classified messaging threads and/or classified users to identify quality metrics and to improve customer service. As described below, classifying messaging threads and/or users allows the messaging thread analyzer 216 to perform a number of analytics that can improve customer service.

To illustrate, the messaging thread analyzer 216 may analyze classified messaging threads to determine responses by a representative that result in successful resolutions and responses that result in failure. In addition, the messaging thread analyzer 216 can identify a number (e.g., ten) of recent conversations that yield successful outcomes and satisfied customers. As another illustration, the messaging thread analyzer 216 may determine which solutions or incentives work best to satisfy customers, and which solutions result in less favorable results. Further, the messaging thread analyzer 216 can determine whether sentiment/emotion improved or worsened during a conversation and if so, what conditions lead the change in sentiment. For example, the messaging thread analyzer 216 may identify that user sentiment went from being negative in one message and improved in a subsequent message and determine the reason for the change in sentiment.

In some embodiments, the messaging thread analyzer 216 can track which channels of communication, or combinations thereof, work best in resolving a user's issue or problem. For example, the messaging thread analyzer 216 may determine that more complaints are resolved via instant message than on a website forum thread. As another example, the messaging thread analyzer 216 may identify that if a representative contacts a user by phone when other channels of communication are not proving successful, the number of satisfied customers increases.

The messaging thread analyzer 216 may track other statistics and metrics that provide feedback regarding customer service satisfactions levels among users (e.g., customers). For example, the messaging thread analyzer 216 may provide a comparison indicating the average number of messages in a successful messaging thread verses the average number of messages in a failed messaging thread. Additionally or alternatively, the messaging thread analyzer 216 can identify the length of time to resolve an issue raised in a messaging thread, or identify the longest pending or unresolved messaging threads. Further, the messaging thread analyzer 216 can identify methods and approaches in replies by representatives that improve customer satisfaction for representatives for use in further social media message responses. The messaging thread analyzer 216 can also identify social media message response strategies that should be discontinued by representatives.

The messaging thread analyzer 216 can also determine whether to post or copy a resolved and/or successful messaging thread to a support forum for the benefit of other users. For example, the messaging thread analyzer 216 can determine that a higher number of users found a particular messaging thread helpful. As such, the messaging thread analyzer 216 can copy the messaging thread to a FAQ help section. Similarly, the messaging thread analyzer 216 can repost a messaging thread classified as a compliment into a testimonial section.

Further, in one or more embodiments, the messaging thread analyzer 216 may compare classification types with each other. For example, the messaging thread analyzer 216 can determine the number of compliments received verses the number of complaints for the same time period. In one or more embodiments, the messaging thread analyzer 216 can also compare success and/or failure rates among differently classified messaging threads. For instance, the messaging thread analyzer 216 may identify that representatives have resolved a majority of issues regarding Product Z, but that representatives are unable to satisfactorily assist users having issues with Application X. As such, the messaging thread analyzer 216 may recommend the entity to increase Application X training among representatives or to provide additional resources in resolving user issues with Application X.

In addition, the messaging thread analyzer 216 can identify a relationship between classified messaging threads that the entity may otherwise miss. For example, the messaging thread analyzer 216 may identify that resolving user account issues reduces the number of user complaints posted on social media more effectively than resolving other issues. As such, the messaging thread analyzer 216 may increase the response priority of user account issues to improve overall customer satisfaction level, as well as the image and the reputation of the entity across social media systems.

The messaging thread analyzer 216 can also track trends by classification type. For example, the messaging thread analyzer 216 can track the number of questions asked and answered over the past week, month, etc. Further, the messaging thread analyzer 216 can determine the number of complaints over time, both total complaints and complaints on a product level. Other identified trends can include arising issues, frequent complaints, top solutions, trending products, etc.

The messaging thread analyzer 216 can analyze user classifications to identify information about users. For example, the messaging thread analyzer 216 can identify top users, such as the top influencers, top spammers, or top at-risk users. Further, the messaging thread analyzer 216 can analyze classified users within each classified messaging threads to determine which users should be given higher response priorities (e.g., influencers) and which users (e.g., spammers) should have their response priority lowered.

In one or more embodiments, the messaging thread analyzer 216 may use the machine-learning algorithm described above. For example, the messaging thread analyzer 216 can provide data to the machine-learning algorithm to teach the machine-learning algorithm when messaging thread classifications are correctly assigned and when a representative changes a messaging thread classification. Similarly, the messaging thread analyzer 216 may teach the machine-learning algorithm to improve user classifications.

Figure 3A:
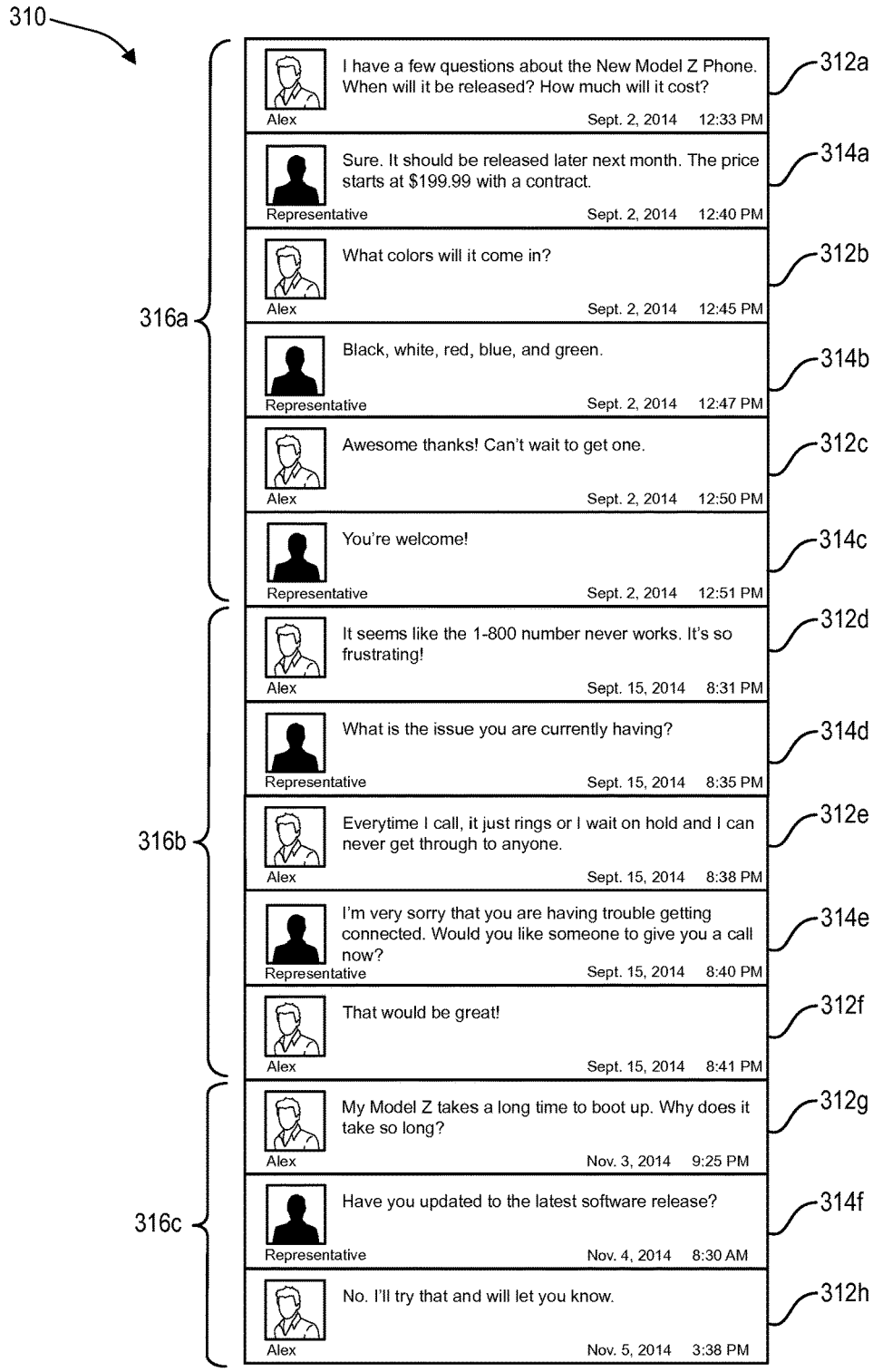
FIG. 3A illustrates a group of social media messages between a user and a representative in accordance with one or more embodiments.

FIG. 3A illustrates a group of social media messages 310 between a user and a representative in accordance with one or more embodiments. The user (i.e., Alex) and the representative in FIG. 3A may be an example of a user and representative described in connection with FIG. 1. Further, the group of social media messages 310 (or simply "group of messages 310") may be posted on the social media system 108 described in connection with FIG. 1.

The group of messages 310 may include messages between Alex (i.e., messages 312*a-h*) and the representative (i.e., messages 314*a-f*). The messages in the group of messages 310 may form a social media discussion between Alex and the representative. Alex may post a messages 312*a* directed towards an entity. For example, Alex may post questions, comments, issues, and/or complaints about a product or service associated with the entity. In response to Alex's initial messages 312*a*, a representative associated with the entity may respond by posting a message 314*a*. The representative's response message 314*a* may seek to resolve Alex's questions or comments. The social media discussion may continue between with Alex posting messages and the representative responding by posting messages. One will appreciate that while a single representative is illustrated, the representative may include multiple agents associated with the entity. Further, in one or more embodiments, the representative may comprise an automated service provided by the entity.

The group of messages 310 may correspond to a number of social media message types. In one or more embodiments, a user and a representative may post the messages on a social media system viewable by the representative, the user, co-users associated with the user, and/or the public at large. For example, the messages may be posted on TWITTER™, FACEBOOK™, GOOGLE+™, TUMBLR™, REDDIT™, or a variety of other social media system. As another possibility, the user may post messages in a customer service forum and the representative may respond by posting messages in the same forum. In alternative embodiments, the user and the representative may send messages in a group of messages directly between each other.

The group of messages 310 may revolve around different topics or subject matter. For example, Alex may initiate a first conversation 316*a* with the representative by sending message 312*a* and ask questions about an upcoming product. The representative may respond with message 314*a* by answering Alex's initial questions. The conversation may continue back and forth between Alex and the representative until Alex's questions are satisfied.

Later, Alex may initiate a second conversation 316*b* with the representative. Alex, having already established a rapport with the representative, may use the previous conversation to continue to ask additional questions to the representative. Alex may post message 312*d* in the same group of messages 310. The pattern of the user sending messages and the representative posting reply messages may repeat each time Alex initiates a conversation with the representative. In this manner, a long string of messages between Alex and the representative can build up in the group of messages 310.

As described above, the message classification system 110 may identify the group of messages 310 between a user and the representative. In addition, the message classification system 110 may organize one or more messaging threads from the group of messages 310. For example, the messaging thread organizer 210 may identify the group of messages 310 between Alex and the representative.

Further, the messaging thread organizer 210 may detect one or more messages in the group of messages 310 that share a common context. For example, the messaging thread organizer 210 may detect the different conversations 316*a-c* as different contexts. To illustrate, the messaging thread organizer 210 may identify gaps in time between messages 314*c* and 312*d* as exceeding an elapsed time threshold. In response to which, the messaging thread organizer 210 may determine that message 314*c* has a different context than message 312*d*. Similarly, the messaging thread organizer 210 may determine that message 312*f* and message 312*g* have to different contexts based on the gap of time between the two messages being over a week.

In some embodiments, the messaging thread organizer 210 may analyze keywords to identify different contexts. For example, the messaging thread organizer 210 may identify the keywords "Model Z" and "cost" in message 312*a*, "1-800 number" and "never works" in message 312*d*, and "Model Z" and "boot" in message 312*g*. The messaging thread organizer 210 may determine that the three messages have different contexts.

In one or more embodiments, the messaging thread organizer 210 may identify syntax and/or sentiments in the messages. For instance, the messaging thread organizer 210 may identify questions in messages 312*a*, 312*b*, 314*d*, 314*e*, 312*g*, and 314*f*. The messaging thread organizer 210 may determine which questions share the same context and which questions belong to different contexts. For example, the messaging thread organizer 210 may determine that questions, "When will it (the New Model Z Phone) be released" and "How much will it cost" in message 312*a*, and the question "What colors will it come in" in message 312*b* all share the context of questions about the Model Z Phone features. Further, the messaging thread organizer 210 may determine that the questions "What issues are you having" in message 314*d* and "Would you like someone to give you a call now" in message 314*e* do not share the context of questions about Model Z Phone features, but rather share the context of general customer service issues.

In additional or alternative embodiments, the messaging thread organizer 210 may identify message cues, such as greetings and closings, to determine breaks between different message contexts. For example, the messaging thread organizer 210 may identify when the representative responds with "You're welcome!" in message 314*c* and the user posting "That would be great!" in message 314*f*. The messaging thread organizer 210 may determine that these messages may indicate the end of a conversation and thus, the end of a message context.

The messaging thread organizer 210 may use one or more of the above methods to determine which messages in the group of messages 310 share common contexts. For example, the messaging thread organizer 210 can detect keywords, time gaps, greeting and closings, and questions in the messages to detect which messages in the group of messages 310 share a common context. For instance, the messaging thread organizer 210 can detect that messages in the first conversation 316*a* share a common context, messages in the second conversation 316*b* share a common context, and messages in the third conversation 316*c* share a common context.

Figure 3B:
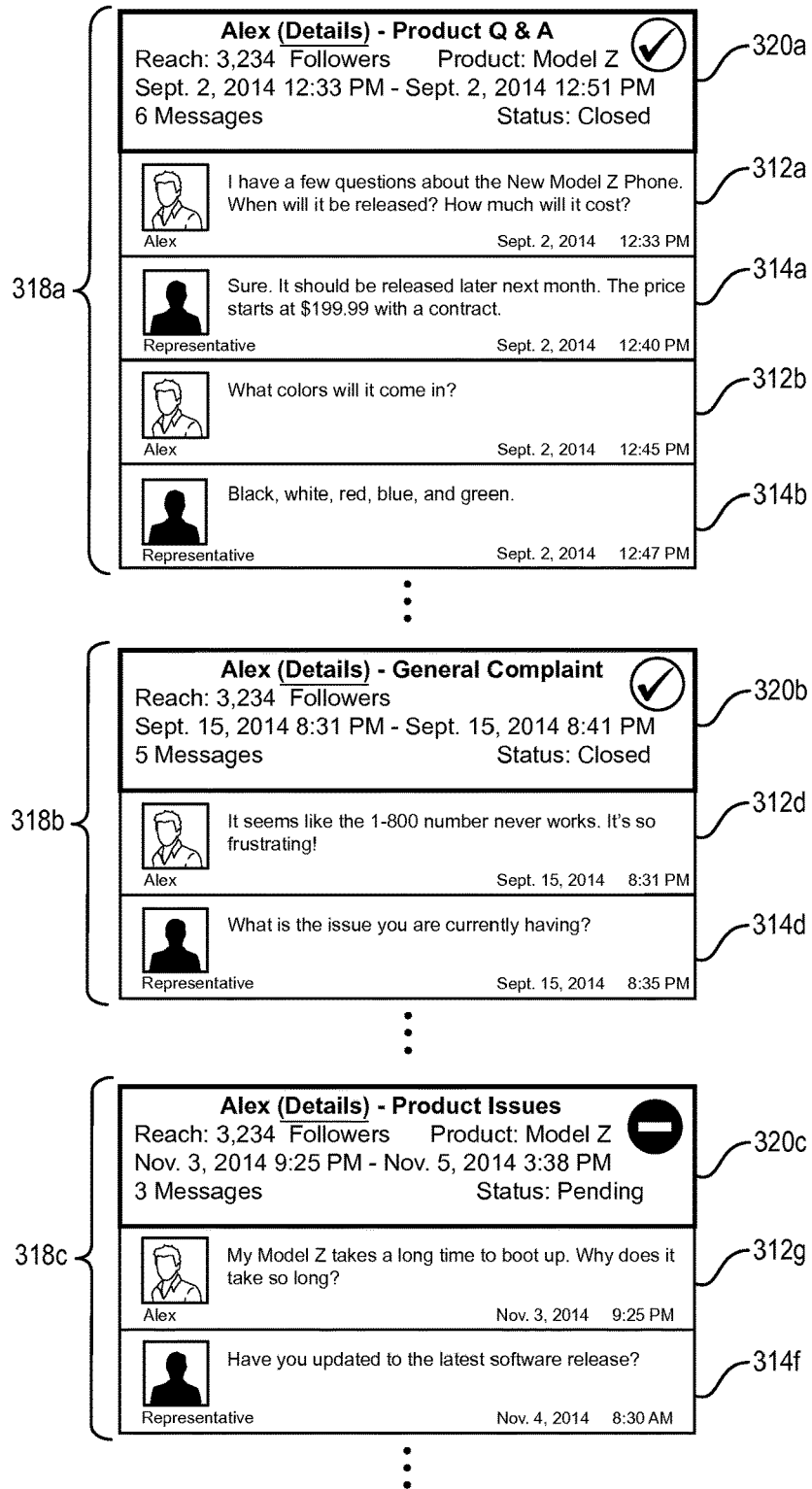
FIG. 3B illustrates the social media messages of FIG. 3A organized into messaging threads in accordance with one or more embodiments.

Upon detecting which messages in the group of messages 310 share a common context, the messaging thread organizer 210 can organize the detected messages into messaging threads. FIG. 3B illustrates various messaging threads 318*a-c* that include the messages in the group of messages 310. For example, the messaging thread organizer 210 can organize the messages in the first conversation 316*a* into a first messaging thread 318*a*, the messages in the second conversation 316b into a second messaging thread 318b, and the messages in the third conversation 316c into a third messaging thread 318c.

As described above, the message classification system 110 may classify each messaging thread 318a-c. In particular, the messaging thread classifier 212 may analyze a messaging thread and classify the messaging thread based on content identified within the messaging thread. To illustrate, the messaging thread classifier 212 may analyze the first messaging thread 318a and identify content corresponding to the Model Z Phone. The messaging thread classifier 212 may also identify questions regarding the Model Z Phone. As such, the messaging thread classifier 212 may classify the first messaging thread 318a as a Product Q&A, with the product being the Model Z Phone.

In another embodiment, the messaging thread classifier 212 may classify the second messaging thread 318b based on user sentiment within the second messaging thread 318b. More specifically, the messaging thread classifier 212 may detect user frustration or negative sentiment in message 312d. As such, the messaging thread classifier 212 may classify the second messaging thread 318b as a general complaint.

In one or more embodiments, the messaging thread classifier 212 may classify a messaging thread based on identifying a classification tag associated with the messaging thread. For example, the representative may manually classify the messaging thread with the appropriate classification. In some embodiments, the messaging thread classifier 212 may provide one or more suggested classification categories to the representative and prompt the representative select the most appropriate category. Further, the messaging thread classifier 212 may allow a representative to edit, modify, add, remove, or change a classification category.

As described above, the messaging thread classifier 212 may use a variety of methods to classify a messaging thread. For example, the messaging thread classifier 212 may use a machine-learning algorithm to identify a classification based on keywords, questions, positive or negative user sentiment, and/or a classification tag selected by a representative. Further, the machine-learning algorithm can learn as the number of classified messaging threads increase and when representatives select or change a messaging thread classification, as described above.

In addition, the messaging thread classifier 212 can generate a messaging thread summary. The messaging thread summary can include information about a messaging thread. As illustrated in FIG. 3B, a messaging thread summary 320a-c can include the primary user in the messaging thread, the category of the messaging thread, the product the messaging thread relates to (if any), the social media reach of the user, the time period of the messaging thread, the number of messages in the messaging thread, the status of the messaging thread, etc. The messaging thread summary may also include a link to more details about the primary user. In one or more embodiments, the messaging thread may also include a link to addition notes corresponding to events that occurred outside of a social media system and that relate to the messaging thread, such as if representative resolved the problem over the phone along with the resolution (if any). Further, the messaging thread summary may include icons indication which communication channels the user has used within the messaging thread (e.g., social media systems, email, instant messenger, VoIP, videoconference, and/or computer conference).

In one or more embodiments, the messaging thread summary may also indicate the social media systems to which the user belongs. For instance, the messaging thread summary may display an icon representing each social media system in which the user participates. The messaging thread summary may also indicate if the user prefers a specific social media system. For example, the messaging thread summary may indicate that the user prefers FACEBOOK™ to other social media system. Thus, if the user posts a question on the entity's website, a representative from the entity may respond to the user's question by posting a social media message on the user's FACEBOOK™ social media feed.

Returning to FIG. 3B, the first messaging thread summary 320a of the first messaging thread 318a displays Alex as the primary user. Alex has a social reach of 3,234 followers. The first messaging thread 318a is classified under the category of Product Q&A and the product is the Model Z phone. The status of the first messaging thread 318a is closed. The first messaging thread summary 320a also displays the posting times for the first and last message as well as the number of messages in the messaging thread 318a.

In one or more embodiments, an icon in the messaging thread may indicate the status of a messaging thread. For example, a check mark icon in the top right corner of the first messaging thread summary 320a indicates that the first messaging thread 318a is closed. A warning or other sign in the top right corner of the third messaging thread summary 320c indicates that the status of the third messaging thread 318c is pending or unresolved. One will appreciate that while the messaging thread summary display two statuses—pending and closed—the messaging thread summary may display any number of different statuses. Further, one will appreciate that a variety of icons or status indicators may be used to visually indicate the statuses of a messaging thread in the messaging thread summary. For example, the messaging threads may be shaded green to indicate a closed status, shaded red to indicate a pending status, or shaded blue to indicate a new message status.

In one or more embodiments, the message classification system 110 can organize messaging threads based on the status of each messaging thread. For example, the message classification system 110 can prioritize pending messaging threads over closed messaging threads to allow representatives to respond to unresolved messaging threads. Alternatively, the message classification system 110 can prioritize completed messaging threads first to allow representatives to review resolved messaging thread in order to address future problems or questions.

Figure 4A:
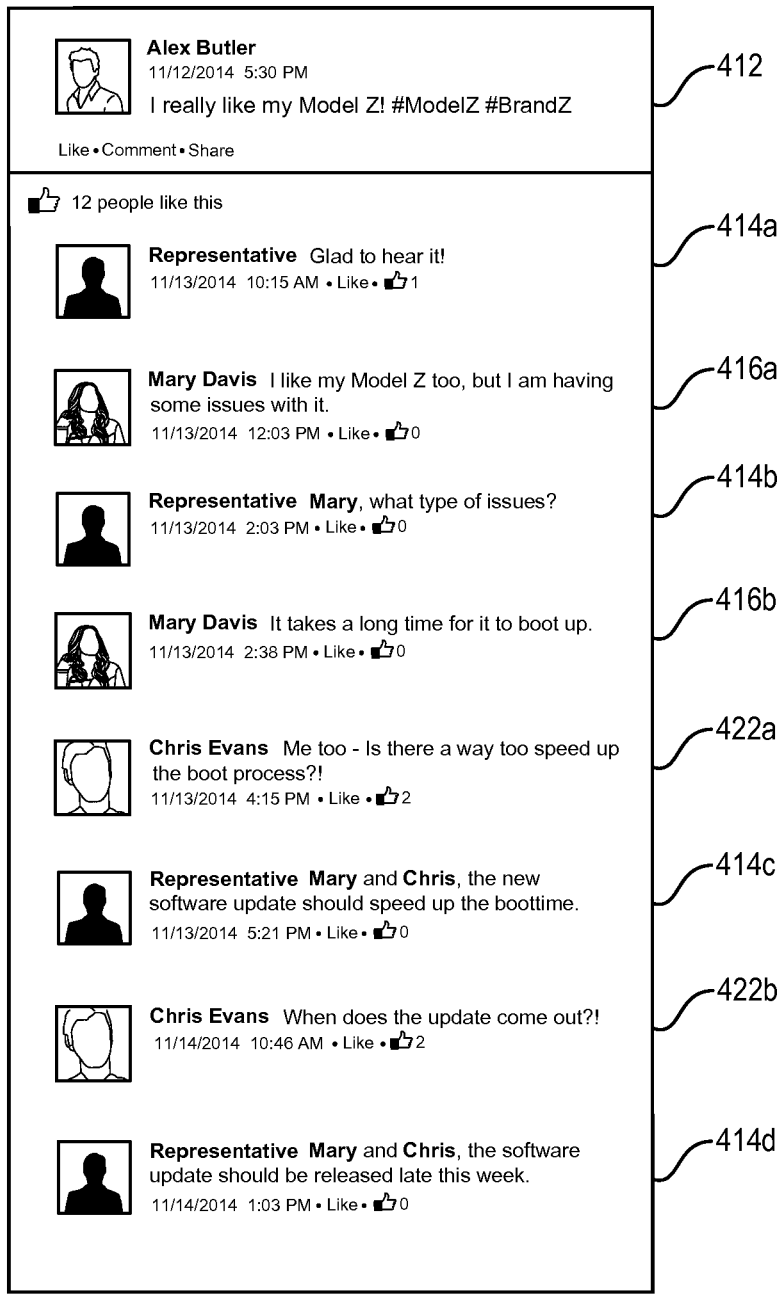
FIG. 4A illustrates a group of social media messages between multiple users and a representative in accordance with one or more embodiments.

FIG. 4A illustrates a group of social media messages 410 between multiple users and a representative. The users (i.e., Alex Butler, Mary Davis, and Chris Evans) and the representative in FIG. 4A may embody example users and an example representative described in connection with FIG. 1. Further, the group of social media messages 410 (or simply "group of messages 410") may be posted on the social media system 108 described in connection with FIG. 1, as described above.

As shown in FIG. 4A, Alex Butler (or simply "Alex") may post a message 412 regarding a product associated with an entity. More specifically, Alex may post a social media message 412 praising Brand Z's Model Z phone. Alex may post the message 412 on his social media feed and mention (e.g., tag) Brand Z and/or the Model Z phone. Additionally or alternatively, Alex may post the message 412 on the social feed of Brand Z.

Regardless of where Alex posts the message 412 on the social media system, a representative of Brand Z may view and reply to Alex's message 412. For instance, a representative may post a reply message 414a to Alex's original message post. In particular, the message classification system 110 may identify social media messages that tag Brand Z, the Model Z phone, and/or other products or services associated with Brand Z. The message classification system 110 may send an indication to a representative when the message classification system 110 identifies a social media message that mentions Brand Z so that a representative of Brand Z (e.g., the entity) can respond to the message.

In addition, other users can comment on Alex's message 412. For example, Mary Davis (or simply "Mary") may post a message 416a commenting on Alex's message 412. As shown in FIG. 4A, Mary's message 416a may raise additional questions about the Model Z phone. Similarly, in the same group of messages 410, Chris Evans (or simply "Chris") may also post a message 422a adding further questions. As the number of messages increase, the group of messages 410 may evolve into a social media discussion that includes a number of questions and covers various topics.

As described above, as a social media discussion grows, an entity may find it difficult to adequately respond to each question, issue, or problem posted by each user. In many cases, the entity may misinterpret a question or problem, or perhaps miss responding to the question or problem altogether. As such, the message classification system 110 can assist the entity by identifying social media messages, organizing contextually similar messages into a messaging thread, classifying the messaging thread, and providing the classified messaging thread to a representative.

As described above, the message classification system 110 may determine a common context based on a number of factors. For example, the message classification system 110 can identify multiple common contexts within the group of messages 410. In particular, the message classification system 110 may detect that messages 412 and 414a share the common context of a product compliment based on Alex posting a message 412 and the representative responding to Alex's message. Further, based on users posting messages, the message classification system 110 may detect that messages 416a, 414a, 416b, 414c, and 414d share the common context of product issue for the Model Z phone between Mary and the representative. The message classification system 110 may detect that messages 422a, 414c, 422b, and 414d share the common context of product issue for the Model Z phone between Chris and the representative. Alternatively, the message classification system 110 may detect that the messages 414b-d, 416a-b, and 422a-b share the common context of product issue for the Model Z phone because both Mary and Chris have similar issues with the Model Z phone.

Figure 4B:
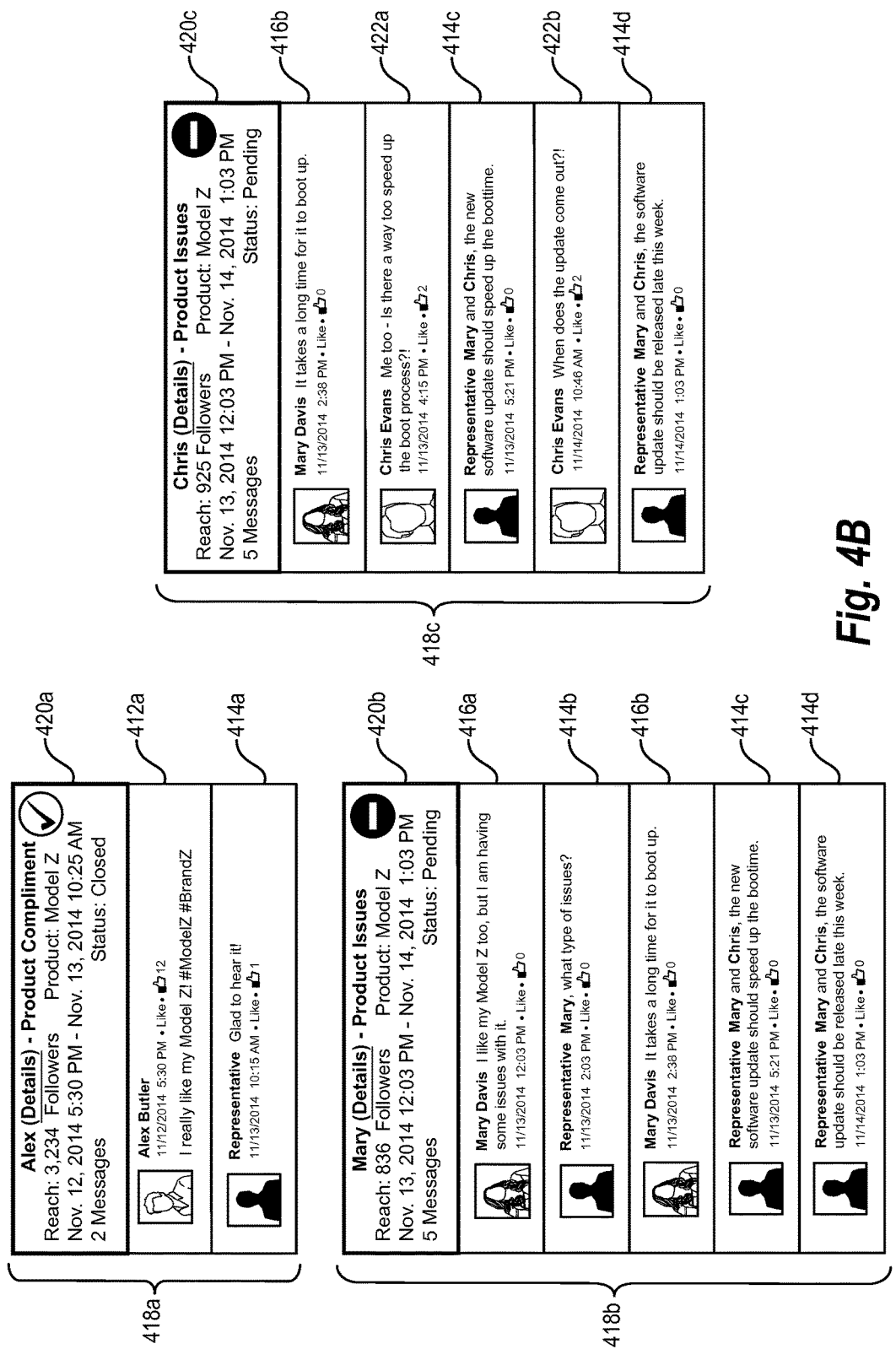
FIG. 4B illustrates the social media messages of FIG. 4A organized into messaging threads in accordance with one or more embodiments.

After detecting common contexts among messages of the group of messages 410, the message classification system 110 can organize the group of messages 410 into one or more messaging threads based on the common contexts. To illustrate, in FIG. 4B the group of messages 410 of FIG. 4A is organized into messaging threads 418a-c. As shown in FIG. 4B, the messaging threads 418a-c may include messages between a user and the representative. In some embodiments, however, a messaging thread associated with a primary user may include messages posted by another user. For example, the message classification system 110 may detect that message 416b by Mary, while not posted by Chris or the representative, sets a foundation for the messaging thread between Chris and the representative. As such, the message classification system 110 may include message 416b in the messaging thread 420c associated with Chris.

Similarly, the message classification system 110 may include a message from the representative in multiple messaging threads when the message pertains to each messaging thread. For example, messages 414c and 414d are addressed to both Mary and Chris. Accordingly, the message classification system 110 includes messages 414c and 414d in messaging threads associated with both Mary and Chris. Alternatively, the message classification system 110 may combine messages between Mary and Chris into the same messaging thread.

As described above, each messaging thread 418 may include a messaging thread summary 420a-c. The messaging thread summary 420a-c can include information about a messaging thread, such as the primary user in the messaging thread, the category of the messaging thread, to which product the messaging thread relates (if any), the social media reach of the user, the time period of the messaging thread, the number of messages in the messaging thread, the status of the messaging thread. The messaging thread summary 420 may also include icons indication the status of each messaging thread.

As shown in FIG. 4B, the message classification system 110 organizes each messaging thread 418a-c from the group of messages 410 according to a common context. Further, the message classification system 110 classifies each messaging thread based on the content within each messaging thread. As such, a representative can quickly and easily review and/or respond to a messaging thread because the message classification system 110 filters out messages that are irrelevant to the issue to which the representative is reviewing and/or responding.

In one or more embodiments, the message classification system 110 can group similarly classified messaging threads together. To illustrate, FIG. 5 shows classified messaging threads groups 512a-c (or simply "messaging thread group"). Each messaging thread group 512a-c may include one or more messaging threads 514a-f having the same classification. For example, the message classification system 110 may classify messaging threads 514a and 514b under the category of Product Q&A, messaging threads 514c and 514d under the category Product Issues, and messaging threads 514e and 514f under the category Product Compliment.

In one or more embodiments, the message classification system 110 may further group messaging threads together. For example, the message classification system 110 may further organize messaging threads classified under the product issues category by product. For instance, the message classification system 110 may organize messaging threads corresponding to product issues with the Model Z phone in one sub-group and messaging threads corresponding to product issues with Application X in another sub-grouping. Alternatively, the message classification system 110 may classify messaging threads corresponding to product issues with the Model Z phone in a different classification group than messaging threads corresponding to product issues with Application X.

Grouping the messaging thread groups 512a-c together may allow the message classification system 110 to compare messaging threads and identify areas where customer service may improve. As discussed above, the message classification system 110 may analyze the messaging threads groups 512a-c to track statistics and metrics that may provide the entity feedback regarding the current level of customer satisfaction. For example, the message classification system 110 may determine average number of messages in a successful messaging thread verses the average number of messages in a failed messaging thread. Additionally or alternatively, the message classification system 110 may identify the length of time it took to resolve an issue raised in a messaging thread, or identify the longest pending (by time or number of messages) messaging threads.

Further, in one or more example embodiments, the message classification system 110 can compare the messaging thread groups 512a-c to determine the number of complaints received verses the number of compliments received in the time period. Similarly, the message classification system 110 can determine if customer service in a particular messaging thread group is improving over time, such as if the number of complaints for the Model Z phone have reduced between the current month and a previous month.

In one or more embodiments, the message classification system 110 can compare success and/or failure rates among differently messaging threads groups 512a-c. For instance, the message classification system 110 may identify that representatives have resolved a majority of issues regarding user account complaints, but that a number of product issues are still unresolved. As such, the message classification system 110 can send an indication to the entity to increase customer service training for representatives responding to product issues, or to further research solutions to product issues.

In addition, by grouping messaging threads into messaging thread groups 514a-f, the message classification system 110 can allow a representative to quickly and easily compare similar messaging threads together. For example, a representative searching for a solution to an unresolved issue can search other messaging threads having the same classification and context to identify a potential solution. Similarly, when a representative closes one messaging thread by resolving a user's issue, the representative may look to see if other messaging threads having the same issues are still pending, and if so, resolve those issues as well.

In some example embodiments, the message classification system 110 may allow a representative to select a messaging thread 514a-f within one of the messaging thread groups 512a-c. For example, a representative may select messaging thread 514d. Upon the representative selecting messaging thread 514d, the message classification system 110 may indicate (e.g., highlight, link to, cause to appear) similar messaging threads that share the same content and/or context as the selected messaging thread. In particular, the message classification system 110 may indicate other messaging threads in the same messaging thread group 412a that share the same identified keyword or question. In addition, the message classification system 110 may indicate similar messaging threads to the representative that also provide a solution or are marked as resolved. For example, upon the representative selecting messaging thread 514d, the message classification system 110 may indicate messaging thread 514c as a solution to the question asked in messaging thread 514d.

In additional or alternative embodiments, the message classification system 110 may classify users. As described above, classifying users allows the entity, or representatives of the entity, to better address and respond to a user's problems, issues, or questions. To illustrate, FIG. 6 shows three categories of user classifications. As shown in FIG. 6, the message classification system 110 can classify users as "Influencers" 612a, "Spammers" 612b, or "At-Risk Customers" 612c. One will appreciate that the message classification system 110 may classify users under additional user classification categories, such as trolls, loyal customers, first time product owners, potential customers, product experts, new users, unknown, etc.

Once the message classification system 110 classifies a user, the message classification system 110 may associate the user's classification with each messaging thread with which the user is associated. For example, the message classification system 110 classifies Alex as an influencer, the message classification system 110 may associate the user classification of influencer to each messaging thread for which Alex is the primary user.

In one or more embodiments, a status color or other indicator may indicate the classification to a representative. For example, the message classification system 110 may shade influencers 612a green, spammers 612b red, and at-risk customers 612c yellow. Further, the message classification system 110 may apply user classification colors to messaging thread summaries. In this manner, a representative can quickly see not only the status of a messaging thread (e.g., closed or pending), but also what the user type associated with the messaging thread's primary user.

In one or more embodiments, the message classification system 110 may identify and/or determine one or more user characteristics before assigning a user classification to a user. For example, the message classification system 110 may determine the social media reach of the user. In particular, the message classification system 110 may determine the social communities to which the user belongs, the number of followers the user has in each social community, the total number of followers or connections the user has, whether the number of follows is increasing or decreasing, how active a user is within one or more social communities, etc. As such, if the user has a large following, the message classification system 110 may classify the user as an influencer or a higher priority customer because the user has the ability to build or weaken the reputation of the entity based on the user's experience. In some cases, the message classification system 110 may assign a user that is influencer with a higher response priority.

Further, in one or more embodiments, the message classification system 110 may determine the social media message contribution type of a user, such as how often a user posts social media messages (e.g., engagement rate) across the various social media systems and whether social media posts are positive or negative. The message classification system 110 can also base a user classification on the average number of "likes," shares, re-posts, etc. a user receives. Based on the user's contribution type, the user classifier 214 can classify the user as a positive contributor (e.g., an influencer), or a negative contributor (e.g., a troll or a spammer).

To illustrate, the message classification system 110 may determine that Alex, Mary, Chris, James, and Ben are influencers 612a based on these users having a high number of followers and/or these user's activity rate on various social media systems, and/or the number of positive messages posted by these users. In addition, the message classification system 110 may classify Greg and Kelly as spammers 612b based Greg and Kelly's high number of connections and number of negative messages. Further, the message classification system 110 may classify Seth as spammer 612b based on the high number of negative messages posted by Seth.

In additional embodiments, the message classification system 110 may classify users based on products purchased by or licensed to the user. For example, if the user previously purchased products from the entity, but is showing doubt about current or future products, the message classification system 110 may classify the user as an at-risk user 612c. For example, Tonya may license an office suite product from Brand Z, but is currently expressing frustration with the office suite product in a number of posted messages (e.g., her recent activity indicates negative posts). Tonya may also be indicating that she is researching alternative office suite products from Brand Z's competitors. As such, the message classification system 110 may classify Tonya as an at-risk customer 612c.

In one or more embodiments, the message classification system 110 may assign or adjust a response priority for the user based on the user's classification type. For example, the message classification system 110 may assign a user classified as an influencer 612a to a higher response priority than a user who is classified as a spammer 612b. Further, the message classification system 110 may prioritize an at-risk user 612c over both influencers 612a and spammers 612b. As such, the message classification system 110 can use response priorities to improve customer service by assisting an entity in responding to higher priority customers before lower priority customers.

Further, the message classification system 110 can use user classifications to identify which users will likely result in positive returns on investment verses which users will likely tie up limited resources. In other words, the message classification system 110 can identify users whom, if the entity keeps happy, will promote the entity to their followers and potentially bring in additional customers. For example, the message classification system 110 can identify James as a user whom the entity should focus efforts on to keep happy (e.g., based on James' social reach, high number of social connections, and engagement rate). Accordingly, representatives should try to quickly address James' questions and reply to social media messages that James posts. Further, based on James' positive influence and daily social activity, the message classification system 110 may suggest that the entity to provide additional incentives (e.g., discounts and promotions).

In contrast, the message classification system 110 may identify users whom the entity can ignore with minimal consequence. For example, the message classification system 110 may identify Seth as a user that has a low number of followers and who posts a large number of negative messages. As such, if representatives ignore Seth's social media messages, the entity will likely not suffer any adverse affects with other users. Alternatively, the message classification system 110 may suggest that the entity provide a discount to Seth to try to convert Seth from a spammer to an influencer.

In one or more embodiments, the message classification system 110 may present a graphical user interface to a representative that displays one or more classified users organized into user classification groups, as described above. Further, the message classification system 110 may allow a representative to select a user. Upon a representative selecting a user, the message classification system 110 may display one or more messaging threads associated with the selected user. For example, the message classification system 110 may display each messaging threads associated with the user. The message classification system 110 may organize the messaging threads by status (e.g., pending, closed, awaiting customer response) and/or by response priority.

Figure 7:
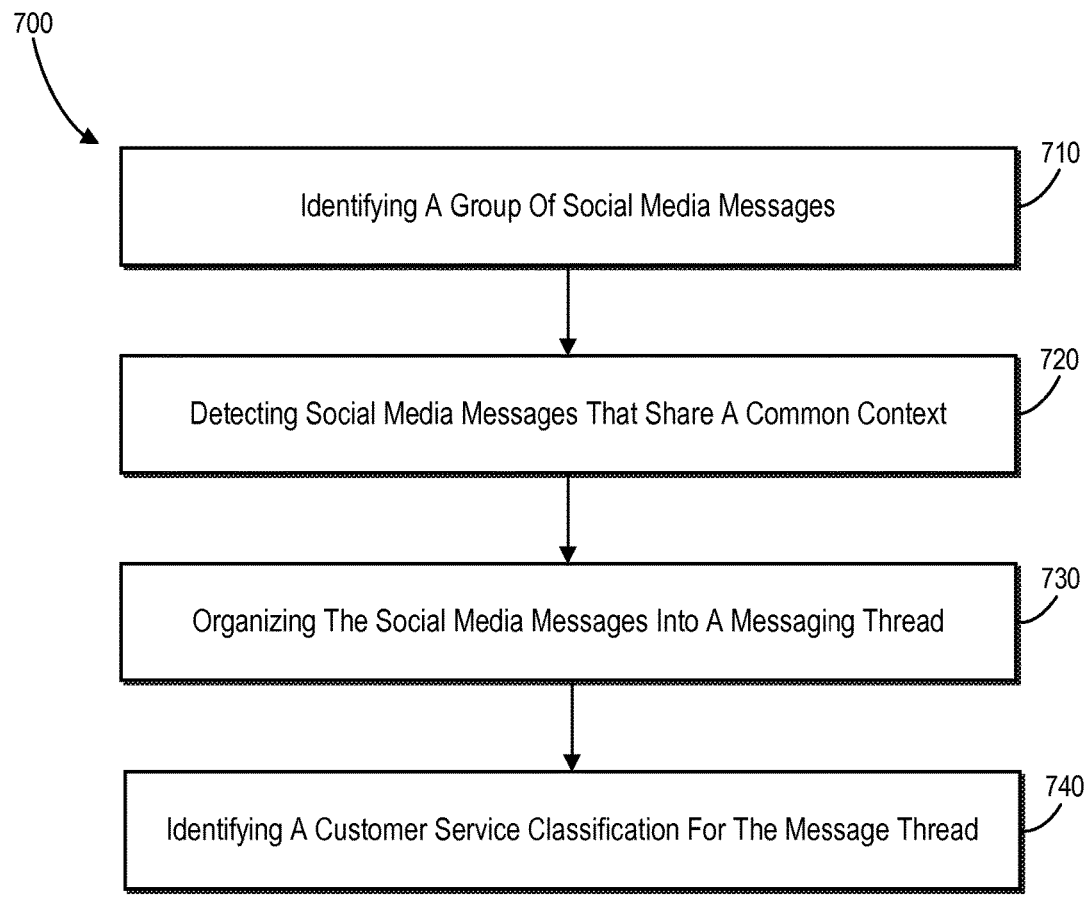
FIG. 7 illustrates a flowchart of a series of acts in a method of classifying messaging threads in accordance with one or more embodiments.
Figure 8:
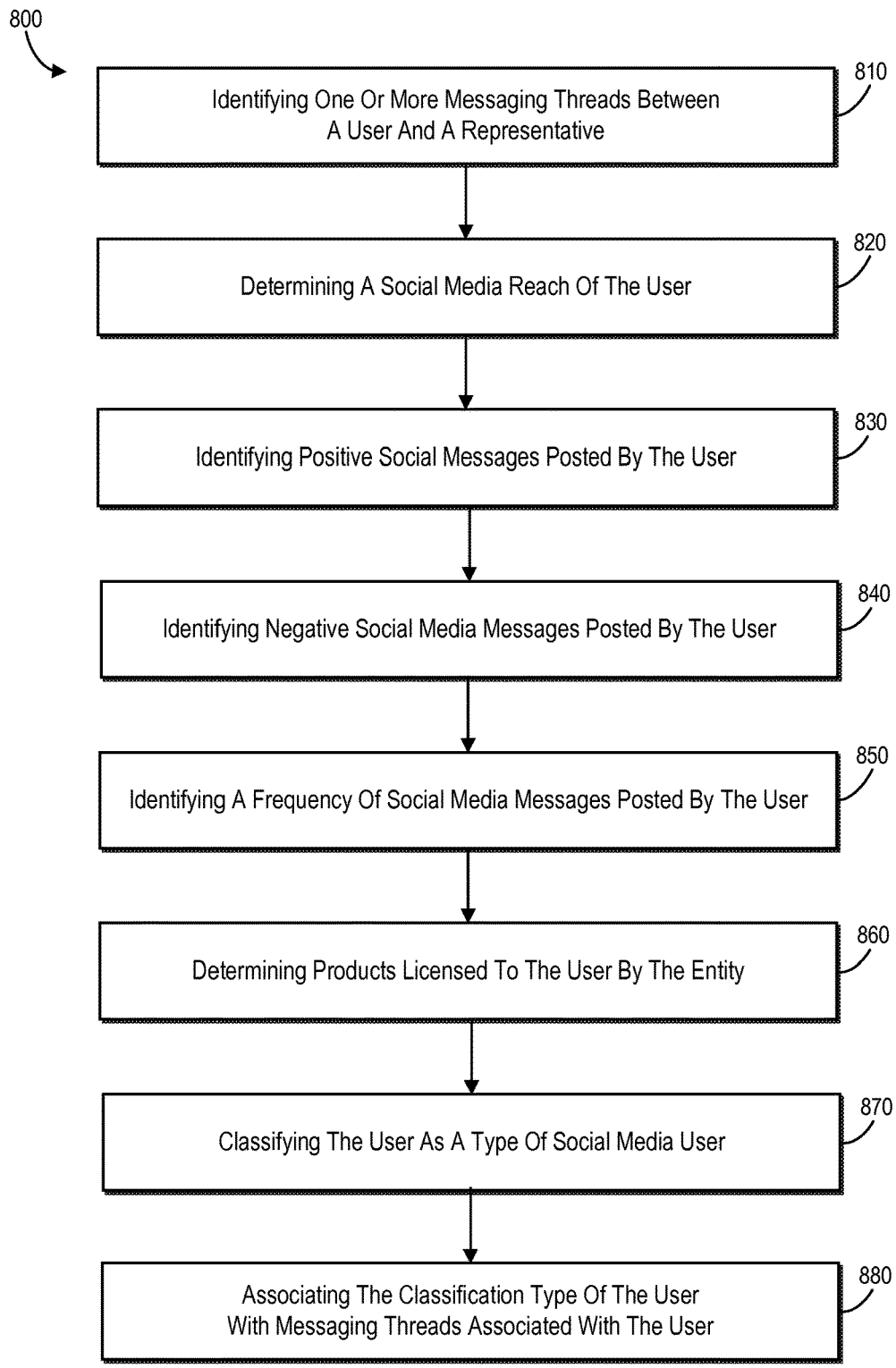
FIG. 8 illustrates a flowchart of a series of acts in a method of classifying users in accordance with one or more embodiments.

FIGS. 1-6, the corresponding text, and the examples, provide a number of different systems and devices for improving customer service through intelligent classification of social media messages. In addition to the foregoing, embodiments can also be described in terms of flowcharts comprising acts and steps in a method for accomplishing a particular result. For example, FIGS. 7 and 8 illustrate flowcharts of exemplary methods in accordance with one or more embodiments of the present invention. The methods described in relation to FIGS. 7 and 8 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of one example method 700 of classifying messaging threads in accordance with one or more embodiments described herein. In one or more embodiments, the method 700 is performed in a digital medium environment for exchanging customer service communications, such as on a social media system, where the communications are social posts accessible by a customer service agent. In one or more embodiments, a machine-learning algorithm may perform method 700, or a portion thereof.

The method 700 includes an act 710 of identifying a group of social media messages 310, 410. In particular, the act 710 may involve identifying a group of social media messages 310, 410 between a plurality of users 102 and a representative 114. For example, act 710 may involve identifying a group of social media messages 310, 410 on one or more social networking systems 108. Further, act 710 may involve identifying social media messages 310, 410 that mention an entity associated with the representative 114. In one or more embodiments, the group of social media messages 310, 410 between the plurality of users 102 and the representative 114 comprise social media messages from a plurality of social media systems 108.

The method 700 includes an act 720 of detecting social media messages that share a common context. In particular, the act 720 may involve detecting, from the group of social media messages 310, 410 between the plurality of users 102 and the representative 114, a subset of social media messages that share a common context. Act 720 may involve further determining one or more common contexts from social media messages within the group of social media messages 310, 410 between the plurality of users 102 and the representative 114 based on associated keyword, user sentiment, questions, greetings and closings, and passage of time. Further, act 720 may involve detecting a common context when a plurality of the social media messages are between a particular user and the representative 114.

Additionally, the method 700 includes an act 730 of organizing the social media messages into a messaging thread 318, 418. In particular, act 730 may involve organizing the subset of social media messages that share the common context into a messaging thread 318, 418. For example, act 730 may involve organizing one or more messaging threads for each set of messages having a common context identified in the group of messages 310, 410. Act 730 may further involve organizing a messaging thread 318, 418 based on a primary user, where the messaging thread 318, 418 includes social media messages between the primary user and the representative 114. In addition, the messaging thread 318, 418 may include social media messages from co-users.

The method 700 also includes an act 740 of analyzing messages within the messaging thread 318, 418. In particular, act 740 may involve analyzing social media messages within the messaging thread 318, 418 to identify one or more of a keyword, questions, positive or negative user sentiment, or a classification tag selected by the representative 114. More specifically, act 740 may involve analyzing content within the social media messages organized into the messaging thread 318, 418 to identify keywords, user sentiment, and the presence of questions.

Further, the method 700 includes an act 750 of identifying a customer service classification for the messaging thread 310, 410. In particular, act 750 may involve identifying a customer service classification for the messaging thread 310, 410 based on one or more of the identified keyword, the questions, the positive or negative user sentiment, or the classification tag. The customer service classification may include one of a questions and answers category, a feedback and opinion category, or a complaints category.

The method 700 may further include a steps of classifying a user of the plurality users 102 as a type of social media user based on the social media reach of the user, the number of positive social media messages posted by the user, the number of negative social media messages posted by the user, the frequency of social media messages posted by the user, and the products currently licensed to the user by an entity associated with the representative 114, and associating the social media user classification type of the user with messaging threads 310 associated with the user.

In one or more embodiments, the method 700 may involve generating a messaging thread summary 320 that includes information about the messaging thread 316a-c. The messaging thread summary 320 may include a name of a primary user in the messaging thread 316a-c, the customer service classification of the messaging thread 316a-c, a number of messages in the messaging thread 316a-c, and time duration of the messaging thread 316a-c. The messaging threads 320 may also include a user classification of the primary user or a social media reach of the primary user. The method 700 may also involve determining a status for the messaging thread 316a-c based on whether the messaging thread is resolved and including a status icon indicating the determined status of the messaging thread 316a-c in the messaging thread summary 320.

In one or more embodiments, the method 700 may include associating the identified customer service classification with the messaging thread 316a-c, and grouping the classified messaging thread 514a-f with a plurality of classified messaging threads 512a-c having the same customer service classification. Further, act 700 may include analyzing the classified messaging threads 512a-c with the group of classified messaging threads 512a-c to identify one or more customer service quality metrics, and providing the one or more customer service quality metrics to an entity associated with the representative 114. In some instances, the customer service quality metrics indicates the number of resolved messaging threads and unresolved messaging threads, a comparison between the number of messaging threads in a first time period (e.g., a week, bi-week, month, etc.) relative to the number of messaging threads in a previous time period (e.g., a week, bi-week, month, etc.), a comparison between a first customer service classified messaging thread relative to a second customer service classified messaging thread, or the number of resolved messaging threads within a time period (e.g., a week, bi-week, month, etc.).

In an additional or alternative embodiment, the method 700 may involve determining a customer service resolution status for each messaging thread in the group of messaging threads, and prioritizing the messaging threads within the group of messaging threads based on the customer service resolution status of each messaging thread. In addition, the method 700 may involve analyzing the customer service classified messaging thread to identify positive parameters that lead to increased customer satisfaction. Further, the method 700 may involve receiving a classification tag for the messaging thread from the representative.

FIG. 8 illustrates a flowchart of another example method 800 of classifying users. The method 800 may be performed in a digital medium environment for hosting social media discussions, where the social media discussions include social posts in one or more social communities. In one or more embodiments, a machine-learning algorithm may perform method 800, or a portion thereof.

The method 800 includes an act 810 of identifying one or more messaging threads 316a-c between a user 102a and a representative 114. In particular, the act 810 may involve identifying one or more messaging threads 316a-c between a user 102a and a representative 114 associated with an entity, each messaging thread being between associated with the user 102a. For example, act 810 may involve identifying one or more messaging threads on one or more social media systems 108. Further, act 810 may involve identifying one or more messaging threads 316a-c between a user 102a and a representative 114 where each messaging thread relates to a different context.

The method 800 also includes an act 820 of determining a social media reach of the user. For example, act 820 may involve determining the number of social media systems 108 in which the user 102a participates. Further, act 820 may involve determining the number of connections and/or followers of the user 102a.

Further, the method 800 includes an act 830 of identifying positive social media messages posted by the user 102a. In particular, the act 830 may involve identifying a number of positive social media messages posted by the user that are favorable towards a product or service associated with the entity. Similarly, the method 800 includes an 840 of identifying negative social media messages posted by the user. In particular, the act 840 may involve identifying a number of negative social media messages posted by the user that are unfavorable towards a product or service associated with the entity. For example, acts 830 and 840 may involve analyzing social media messages to determine whether the user 102 posts positive or negative social media messages in connection with the entity.

In addition, the method 800 involves an act 850 of identifying a frequency of social media messages posted by the user. For example, act 850 may involve identifying how often the user 102a posts messages on each of the social media systems 108 in which the user 102a participates. Act 850 may also involve identifying if the user 102a has recently increased or decreased the frequency of social media message posts.

The method 800 involves an act 860 of determining products currently licensed to the user 102a by the entity. For example, act 860 may involve tracking previous and current products that a user 102a has purchased and/or licensed from the entity. In addition, act 860 may involve determining if a product currently licensed by the user 102a is about to expire. Further, act 860 may involve determining if a product currently licensed by the user 102a is about to be replaced with an upgraded product.

The method 800 includes an act 870 of classifying the user 102a as a type of social media user 612. In particular, act 870 may involve classifying the user 102a as a type of social media user based 612 on one or more of the social media reach of the user, the number of positive social media messages posted by the user, the number of negative social media messages posted by the user, the frequency of social media messages posted by the user, and the products currently licensed to the user by the entity. For example, act 870 may involve classifying the user 102a as an influencer 612a, a spammer 612b, or an at-risk customer 612c.

The method 800 includes an act 880 of associating the classification type of the user with messaging threads associated with the user. In particular, act 880 may include associating the social media user classification type of the user with messaging threads associated with the user. Additionally, the method 800 can include classifying the one or more messaging threads and grouping the one or more messaging threads with other messaging threads that share the same social media user classification type as the one or more messaging threads.

Embodiments of the present disclosure may comprise or utilize a special purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
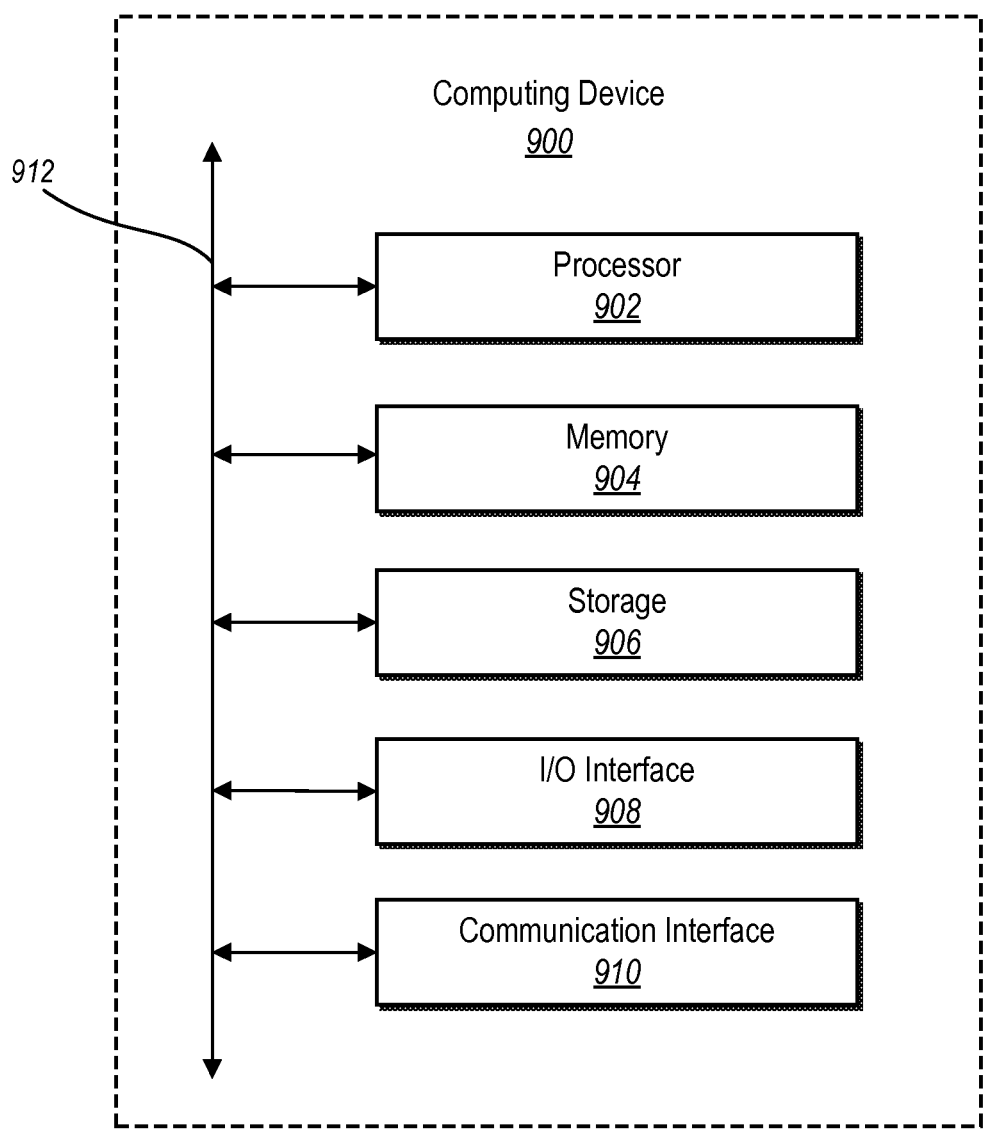
FIG. 9 illustrates a block diagram of an exemplary computing device in accordance with one or more embodiments.

FIG. 9 illustrates a block diagram of an exemplary computing device 900 that may be configured to perform one or more of the processes described above. One will appreciate that one or more computing devices, such as the computing device 900, may implement the message classification system 110. In particular, any of the client device 104, the social media system 108, the message classification system message classification system 110, and the representative device 112 can comprise a computing device 900. As shown by FIG. 9, the computing device 900 can comprise a processor 902, memory 904, a storage device 906, an I/O interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In particular embodiments, the processor 902 includes hardware for executing instructions, such as those making up a computer program. As an example and not by way of limitation, to execute instructions, the processor 902 may retrieve (or fetch) the instructions from an internal register, an internal cache, the memory 904, or the storage device 906 and decode and execute them. In particular embodiments, the processor 902 may include one or more internal caches for data, instructions, or addresses. As an example and not by way of limitation, the processor 902 may include one or more instruction caches, one or more data caches, and one or more translation lookaside buffers (TLBs). Instructions in the instruction caches may be copies of instructions in the memory 904 or the storage 906.

The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The storage device 906 includes storage for storing data or instructions. As an example and not by way of limitation, the storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. The storage device 906 may include removable or non-removable (or fixed) media, where appropriate. The storage device 906 may be internal or external to the computing device 900. In particular embodiments, the storage device 906 is non-volatile, solid-state memory. In other embodiments, the storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user to provide input to, receive output from, and otherwise transfer data to and receive data from the computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 910 may facilitate communications with a wireless PAN (WPAN) (such as, for example, a BLUETOOTH™ WPAN), a WI-FI network, a WI-MAX network, a cellular telephone network (such as, for example, a Global System for Mobile Communications (GSM) network), or other suitable wireless network or a combination thereof.

Additionally, the communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 may include hardware, software, or both that couples components of the computing device 900 to each other. As an example and not by way of limitation, the communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for exchanging customer service communications, where the communications are social posts accessible by a customer service agent, a method for categorizing communications, the method comprising:

identifying, by at least one processor, a social media message thread between a plurality of users and a representative of an entity, the plurality of users comprising a first user and one or more additional users, and the social media message thread comprising public social media messages between the first user and the representative and social media messages between the one or more additional users and the representative, wherein the social media message thread is presented in a public social media graphical user interface accessible to the plurality of users and the representative;

analyzing the social media message thread of the plurality of users to determine a plurality of common contexts, the plurality of common contexts comprising a first common context;

identifying, from the social media message thread between the plurality of users and the representative, a first subset of public social media messages between the first user and the representative that share the first common context based on message reply-identifier tags identifying a chain of previous public messages between the first user and the representative;

generating, based on the message reply-identifier tags, a separate first filtered message thread comprising the first subset of public social media messages between the first user and the representative that share the first common context; and providing, to a computing device associated with the representative, the first filtered message thread within a private graphical user interface accessible to the representative, wherein the private graphical user interface displays the first filtered message thread comprising the first subset of public social media messages between the first user and the representative that share the first common context without displaying any public social media messages in the social media message thread between the plurality of users and the representative, and wherein the first subset of public social media messages between the first user and the representative within the first filtered message thread are viewable to the plurality of users as part of the public social media message thread via the public social media graphical user interface.

2. The method of claim 1, further comprising:

receiving, from the computing device associated with the representative, a public reply social media message to the first filtered message thread;

adding the public reply social media message to the social media message thread between the plurality of users and a representative, wherein each user of the plurality of users views the public reply social media message within the social media message thread via the public social media graphical user interface; and displaying the public reply social media message in the first filtered message thread within the private graphical user interface accessible to the representative.

3. The method of claim 1, further comprising:

identifying, from the public social media message thread between the plurality of users and the representative, a second subset of public social media messages between a second user and the representative that share the first common context;

generating a separate second filtered message thread comprising the second subset of social media messages between the second user and the representative that share the first common context; and providing, to the computing device associated with the representative and within the private graphical user interface, the second filtered message thread, wherein the second filtered message thread is displayed as a separate filtered message thread of the public social media message thread apart from the first filtered message thread within the private graphical user interface, wherein the second filtered message thread between the second user and the representative comprises the second subset of public social media messages that share the first common context without comprising any public social media messages in the social media message thread between the first user or the plurality of users and the representative.

4. The method of claim 3, further comprising:

providing, to the public social media message thread and viewable to the plurality of users, response messages from the representative in response to the social media messages in first filtered message thread and the second filtered message thread;

grouping the first filtered message thread and the second filtered message thread into a unified message thread based on the first filtered message thread and the second filtered message thread sharing the first common context;

generating a message thread summary for the unified message thread comprising a name of a primary user in the unified message thread, a customer service classification of the unified message thread, a number of messages in the unified message thread, and a duration of the unified message thread; and providing, within the private graphical user interface accessible to the representative, the message thread summary for the unified message thread in a single combined message thread user interface.

5. The method of claim 4, wherein the first filtered message thread and the second filtered message thread comprise a same message from the representative, and wherein the same message is separately displayed in the first filtered message thread and the second filtered message thread within the private graphical user interface accessible to the representative.

6. The method of claim 5, wherein the message thread summary further comprises a social media reach of the first user; and the method further comprising:
determining a status of the unified message thread based on whether questions or issues raised in the message thread are resolved; and
displaying a status icon within the message thread summary indicating the determined status of the message thread.

7. The method of claim 4, further comprising:
analyzing social media messages within the first filtered message thread to identify one of a keyword, question, positive sentiment, or negative user sentiment;
identifying the customer service classification for the first filtered message thread based on analyzing the social media messages within the first filtered message thread for the identified keyword, question, positive sentiment, or negative user sentiment; and
grouping the first filtered message thread with the identified customer service classification with a plurality of classified message threads having the same customer service classification.

8. The method of claim 7, further comprising:
analyzing the plurality of classified message threads to identify one or more customer service quality metrics, wherein the customer service quality metrics comprises at least one of:
a number of resolved message threads and unresolved message thread s;
a comparison of a number of message threads in a first time period relative to a number of message threads in a second time period;
a comparison of a first customer service classified message thread relative to a second customer service classified message thread; or
a number of resolved message threads in the first time period; and
providing, within the private graphical user interface accessible to the representative, the one or more customer service quality metrics to the computing device associated with the representative.

9. The method of claim 1, further comprising:
detecting a first additional public message to the public social media messages by the first user;
detecting a second additional public message to the public social media messages by a second user of the one or more additional users;
adding the first additional public message to the first filtered message thread based on the first additional public message being associated with the first common context; and
filtering the second additional public message to be excluded from display in the first filtered message thread.

10. The method of claim 1, wherein identifying the first subset of public social media messages between the first user the representative that share the first common context is further based on time gaps between the public social media messages and sentiments of the public social media messages.

11. The method of claim 1, further comprising:
determining the plurality of common contexts from the social media message thread between the plurality of users and the representative based on at least one of an associated keyword, user sentiment, questions, greetings and closings, and a passage of time within the public social media messages included in the social media message thread;
classifying the first filtered message thread based on the first common context provided by the plurality of messages within the first filtered message thread; and
providing, to the computing device associated with the representative, the classification of the first filtered message thread.

12. The method of claim 1, further comprising identifying the social media message thread between the plurality of users and the representative by:
identifying the first user posting a first social media message and the representative posting a reply to the first social media message by the first user within the social media message thread;
identifying, in response to the representative posting a reply to the first social media message, a second user adding a second social media message to the social media message thread; and
identifying the representative posting a reply to the second social media message by the second user within the social media message thread.

13. A non-transitory computer readable storage medium having stored thereon computer-executable instructions, that, when executed by a processor, cause a computing device to:
identify a plurality of message threads between a user and a representative associated with an entity;
determine social media data of the user from the plurality of identified message threads between the user and the representative associated with an entity, wherein the social media data comprises a number of positive social media messages comprising positive text composed by the user that are favorable towards a product or service associated with the entity, a number of negative social media messages comprising negative text composed by the user that are unfavorable towards a product or service associated with the entity, and a frequency of social media messages posted by the user;
determine a social media user classification type of the user based on the social media data of the user determined from the plurality of identified message threads, wherein social media user classification types comprise influencers, at-risk customers, spammers, and potential customers;
generate, for each social media user classification type, a social media user classification list visual interface that comprises a of list users that share a corresponding social media user classification type, wherein one of the social media user classification list visual interfaces comprises the user; and provide, to a representative computing device associated with the representative for display in a private graphical user interface non-viewable to non-representative users, each of the social media user classification list user interfaces with an assigned response priority, wherein each of the media user classification list visual interfaces are separate visual interfaces within the private graphical user interface, and wherein users with the social media user classification type of at-risk customers are assigned a higher response priority than users with the social media user classification type of spammers.

14. The non-transitory computer readable storage medium of claim 13, wherein each user in the list of users within each of the user classification list visual interfaces comprises a display that includes a name, a number of follower, an engagement rate, a sentiment rating, and a status of the user.

15. The non-transitory computer readable storage medium of claim 14, wherein the instructions, when executed by the processor, further cause the computing device to determine the social media user classification type for the user by:
   classifying the user as an influencers; and
   increasing a response priority associated with the user above response priorities of users classified as spammers.

16. The non-transitory computer readable storage medium of claim 13, further comprising instructions that, when executed by the processor, further cause the computing device to:
   receive, from the representative computing device associated with the representative, a selection of the user from one of the social media user classification list visual interfaces; and
   provide, to the representative computing device associated with the representative, one or more message threads associated with the user.

17. The non-transitory computer readable storage medium of claim 13, further comprising instructions that, when executed by the processor, further cause the computing device to update, within the private graphical user interface, the social media user classification list visual interfaces to move the user from a first social media user classification list visual interface to a second social media user classification list visual interface based on determining an updated a social media user classification type for the user.

18. A system for categorizing communications, the system being associated with a digital medium environment for exchanging customer service communications, where the communications are social posts accessible by a customer service agent, the system comprising:
   at least one processor; and
   at least one non-transitory computer-readable storage medium storing instructions thereon that, when executed by the at least one processor, cause the system to:
   identify a social media message thread between a plurality of users and a representative of an entity, the plurality of users comprising a first user and one or more additional users, and the social media message thread comprising public social media messages between the first user and the representative and public social media messages between the one or more additional users and the representative, wherein the social media message thread is presented in a public social media graphical user interface accessible to the plurality of users and the representative;
   analyze the social media message thread of the plurality of users to determine a plurality of common contexts, the plurality of common contexts comprising a first common context;
   identify, from the social media message thread between the plurality of users and the representative, a first subset of public social media messages between the first user and the representative that share the first common context based on message reply-identifier tags identifying a chain of previous messages between the first user and the representative;
   generate, based on the message reply-identifier tags, a separate first filtered message thread comprising the first subset of public social media messages between the first user and the representative that share the first common context; and
   provide, to a computing device associated with the representative, the first filtered message thread within a private graphical user interface accessible to the representative, wherein the private graphical user interface displays the first filtered message thread comprising the first subset of public social media messages between the first user and the representative that share the first common context without displaying any public social media messages in the social media message thread between the plurality of users and the representative, and wherein the first subset of public social media messages between the first user and the representative within the first filtered message thread are viewable to the plurality of users as part of the public social media message thread via the public social media graphical user interface.

19. The system of claim 18, further comprising:
   presenting, in the private graphical user interface of the computing device associated with the representative, a plurality of filtered message threads between a single user and the representative that share the first common context with the first filtered message thread;
   receiving, from the computing device associated with the representative, a selection of a second filtered message thread from the plurality of filtered message threads that shares the first common context with the first filtered message thread; and
   providing, to a computing device associated with the first user, access to the selected second filtered message thread that shares the first common context with the first filtered message thread.

20. The system of claim 19, wherein the second filtered message thread is marked as resolved for the first common context.

* * * * *